United States Patent
Kaushal et al.

(10) Patent No.: US 10,819,848 B2
(45) Date of Patent: *Oct. 27, 2020

(54) FAULT ROUTING OF AN EMERGENCY COMMUNICATION

(71) Applicant: COMCAST CABLE COMMUNICATIONS, LLC, Philadelphia, PA (US)

(72) Inventors: Arvind Kaushal, Marlton, NJ (US); Jon Boone, Coatesville, PA (US); Brett Sherman, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,926

(22) Filed: Apr. 16, 2019

(65) Prior Publication Data
US 2019/0312971 A1 Oct. 10, 2019

Related U.S. Application Data

(63) Continuation of application No. 15/808,650, filed on Nov. 9, 2017, now Pat. No. 10,313,512, which is a
(Continued)

(51) Int. Cl.
*H04W 76/50* (2018.01)
*H04M 3/42* (2006.01)
(Continued)

(52) U.S. Cl.
CPC .... *H04M 3/42187* (2013.01); *H04L 65/1006* (2013.01); *H04L 65/1066* (2013.01);
(Continued)

(58) Field of Classification Search
CPC ....... H04W 76/50; H04W 76/18; H04W 4/90; H04L 65/1006; H04L 65/1066;
(Continued)

(56) References Cited

U.S. PATENT DOCUMENTS

2005/0203673 A1* 9/2005 El-Hajj ................. G06Q 10/08
701/1
2008/0125077 A1* 5/2008 Velazquez ............... H04L 12/66
455/404.2
(Continued)

*Primary Examiner* — Phong La
(74) *Attorney, Agent, or Firm* — Ballard Spahr LLP

(57) ABSTRACT

Aspects of the disclosure relate to routing of an emergency communication under fault conditions. Routing can be implemented in a packet-switching (PS) network that provides voice service. For a network node of the PS network, availability to route the emergency communication through a specific emergency service routing number (ESRN) can be determined and, in response to the network node being unavailable, administrative data associated with the ESRN can be accessed. In addition, an identifier associated with the administrative data can be updated (e.g., created or modified) with data indicative of the device that originated the emergency communication. The administrative data and the resulting identifier can be delivered to a second network node that can route the emergency communication to an emergency service network.

20 Claims, 15 Drawing Sheets

Related U.S. Application Data continuation of application No. 14/164,982, filed on Jan. 27, 2014, now Pat. No. 9,854,091, which is a continuation of application No. 13/219,245, filed on Aug. 26, 2011, now Pat. No. 8,675,473.

(51) Int. Cl.
| | |
|---|---|
| *H04L 29/06* | (2006.01) |
| *H04M 3/12* | (2006.01) |
| *H04M 3/22* | (2006.01) |
| *H04W 76/18* | (2018.01) |
| *H04W 4/90* | (2018.01) |

(52) U.S. Cl.
CPC .......... *H04L 65/1069* (2013.01); *H04L 65/40* (2013.01); *H04W 76/50* (2018.02); *H04M 3/12* (2013.01); *H04M 3/2218* (2013.01); *H04M 2242/04* (2013.01); *H04W 4/90* (2018.02); *H04W 76/18* (2018.02)

(58) Field of Classification Search
CPC ................ H04L 65/1069; H04L 65/40; H04M 3/42187; H04M 3/12; H04M 2242/04; H04M 3/2218
USPC ........................................................ 370/216
See application file for complete search history.

(56) References Cited

U.S. PATENT DOCUMENTS

| | | | |
|---|---|---|---|
| 2008/0144605 A1* | 6/2008 | Qiu ..................... | H04M 7/0084 370/352 |
| 2009/0284348 A1* | 11/2009 | Pfeffer ................. | G08B 25/016 340/7.3 |
| 2010/0174737 A1* | 7/2010 | Stein ................... | H04M 3/4935 707/769 |

* cited by examiner

FAULT ROUTING OF AN EMERGENCY COMMUNICATION

CROSS REFERENCE TO RELATED PATENT APPLICATIONS

This application is a continuation of U.S. application Ser. No. 15/808,650, filed Nov. 9, 2017; which is a continuation of U.S. application Ser. No. 14/164,982, filed Jan. 27, 2014, which issued as U.S. Pat. No. 9,854,091; which is a continuation of U.S. application Ser. No. 13/219,245, filed Aug. 26, 2011, which issued as U.S. Pat. No. 8,675,473, which are herein incorporated by reference in their entireties.

BACKGROUND

Reliability is paramount in communication platforms, particularly for platforms that administer and handle emergency calls. Yet, conventional technologies and related communication protocols, for example, present a tangible risk for catastrophic failure of handling of an emergency call, in which case the call may remain unanswered.

SUMMARY

Some embodiments of the subject disclosure provide routing of a packet-switched emergency call under fault conditions including overflow conditions or non-operation conditions. The packet-switched emergency call can originate in a packet-switching (PS) network for voice service, and the fault conditions can refer to conditions specific to an emergency service network in which the packet-switched emergency call fails to complete. For simplicity, in the disclosure, a packet-switched emergency call is referred to as an "emergency call." Yet, other type of emergency communications also can be an "emergency call." In one aspect, for a network node of the PS network, availability to route the emergency call through a specific emergency service routing number (ESRN) is determined. In response to the network node being unavailable, administrative data, such as an administrative number, associated with the ESRN is accessed. For example, the administrative data can comprise an administrative number which can be a 10-digit contingency routing number (CRN) or a 10-digit alternate emergency access number (AEAN). In addition, an identifier associated with the administrative data, such as the administrative number, is updated (e.g., composed or modified) with data indicative of the device that originated the emergency call. The administrative data (e.g., the administrative number) and the identifier resulting from such update are delivered to a second network node that routes the emergency call to an emergency service network.

Some embodiments of the subject disclosure provide several advantages with respect to conventional solutions for fault routing of emergency calls in PS networks for voice service. It should be appreciated that one or more of such advantages also can be accomplished in other type of networks. As an exemplary advantage, the overflow routing of an emergency call according to aspects described herein is resilient to errors in calling party information (e.g., calling number of a user device originating the emergency call) that may arise in the course of routing configuration for the emergency call. For instance, when an emergency call according to the National Emergency Number Association (NENA) I2 protocol fails, by providing an identifier indicative of the calling party information, the overflow routing set forth in the subject disclosure remains immune to the random replacement of the calling party information with an emergency services query key (ESQK) that occurs in the NENA I2 protocol. As another exemplary advantage, the routing described herein provides reliability features based on a failover solution that can seamlessly be integrated into conventional routing without the complexity (e.g., added call session legs and length) present in typical solutions. For instance, incorporation of the identifier indicative of the calling party information can be accomplished through suitable metadata added into session control messaging. As yet another exemplary advantage, overflow routing that comprises the identifier described herein enables an operator in an emergency services network to initiate a downstream call session to the user device.

Additional aspects or advantages of the subject disclosure will be set forth in part in the description which follows, and in part will be obvious from the description, or may be learned by practice of the subject disclosure. The advantages of the subject disclosure will be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The annexed drawings are an integral part of the subject disclosure and illustrate exemplary embodiments thereof. Together with the description set forth herein and claims appended hereto the annexed drawings serve to explain various principles, features, or aspects of the subject disclosure.

DETAILED DESCRIPTION

Figure 1:
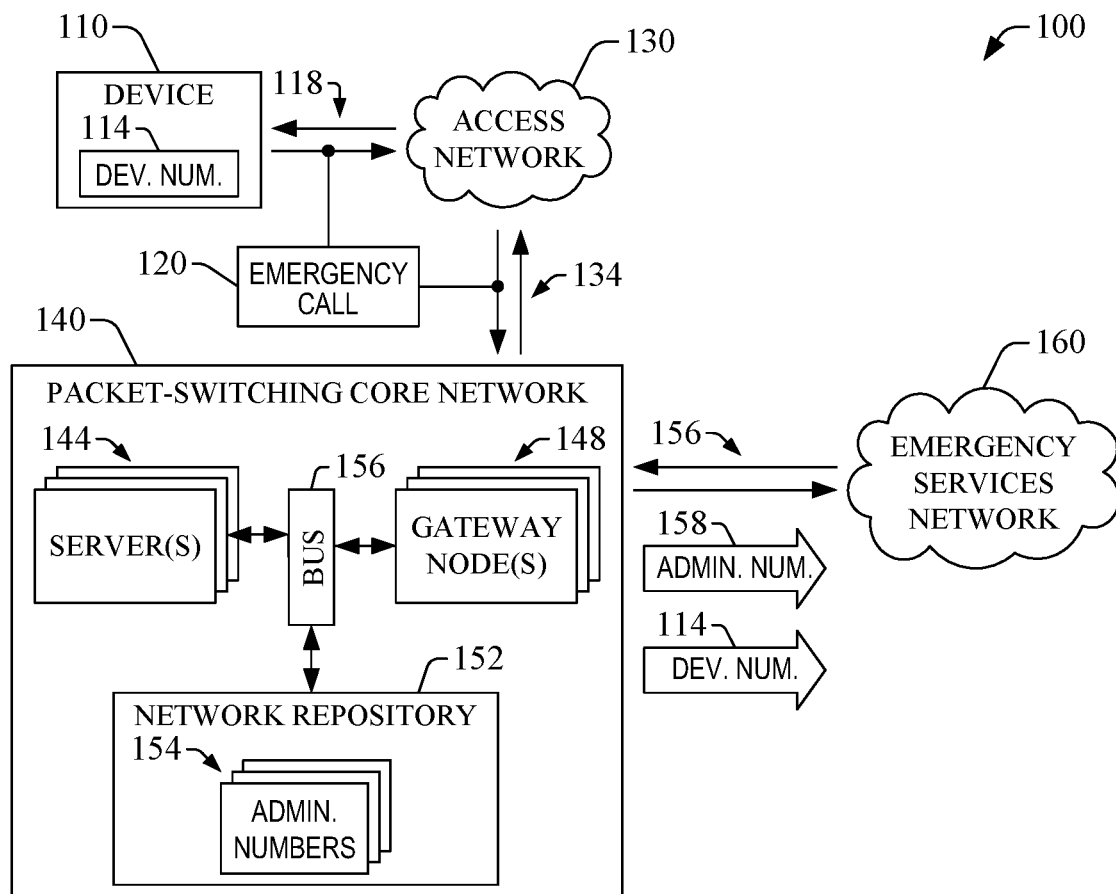
FIG. 1 illustrates an exemplary network environment that enables routing of an emergency communication (e.g., an emergency call) in accordance with aspects of the subject disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the subject disclosure is not limited to specific systems, articles, apparatuses, and methods for routing emergency communications, such as a packet-switched emergency call (e.g., a packet-switched 911 call), under a fault condition at a network element in an emergency services network. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "component," "unit," "interface," "platform," "node," "function," "controller" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting.

In addition, while such illustrations are presented for a unit, the foregoing examples also apply to a node, a function, a controller, a component, a system, a platform, and the like. It is noted that in certain embodiments, or in connection with certain aspects or features such embodiments, the terms "unit," "component," "system," "interface," "platform" "node," "function," "controller" can be utilized interchangeably.

Throughout the description and claims of this specification, the words "comprise" and "having" and their variations, such as "comprising" and "comprises," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Reference will now be made in detail to the various embodiments and related aspects of the subject disclosure, examples of which are illustrated in the accompanying drawings and their previous and following description. Wherever possible, the same reference numbers are used throughout the drawings to refer to the same or like parts.

As described in greater detail below, the subject disclosure relates to routing emergency communications, such as a packet-switched emergency call (e.g., a packet-switched 911 call) under a fault condition at a network element in an emergency services network. The routing described herein provides reliability based in part on a failover solution that can be integrated seamlessly into conventional routing without the complexity (e.g., added call session legs and length) present in typical solutions. Some elements of the subject disclosure can be implemented (e.g., performed) by software, hardware, or a combination of software and hardware. Functional elements of the various embodiment(s) described in the present specification and illustrated in the annexed drawings can be employed in operational environments (access network, telecommunication network, signaling network, etc.) that can include, for example, digital equipment, analog equipment, or both, wired or wireless equipment, etc. While several exemplary embodiments and related functionality of the disclosure are described and illustrated in connection with an administrative number, other administrative data also can be exploited to implement various embodiments of the disclosure and accomplish the described functionality. In general, the administrative data can comprise a number, such as an administrative number.

In one aspect, the disclosure identifies and addresses a scenario where, for example, as in present telephony environments, National Emergency Number Association (NENA) I2 protocol is a methodology for providing emergency, or 911, service. An implementation of NENA I2 relies on maintaining conventional architecture of 911 service; namely, direct trunks to public safety answering points (PSAPs) and a 10 digit administrative number as the final route destination in case of the PSAP trunks being busy or otherwise unavailable. In case of the final route of an emergency call, an emergency services network administrator typically exploits the telephone number of a calling party to acquire location information of the telephone that originates the emergency call. Yet, in the NENA I2 protocol, the calling party's information typically is overwritten with a real-time emergency services query key (ESQK) by the VoIP Positioning Center (VPC) provider, and such ESQK is utilized as the key to determine the telephone number of the calling party and address information by the PSAP operator.

Accordingly, reliability issues or catastrophic failure may arise when the emergency call routed according to the NENA I2 protocol fails due to the ESQK having overwritten the calling party's information, since any overflow route or, more generally, fault route likely provides incorrect calling party information to the emergency service responder.

Referring to the drawings, FIG. 1 illustrates a high-level block diagram of an exemplary network environment in which routing of an emergency communication (e.g., an emergency call) under fault conditions can be implemented in accordance with aspects of the disclosure. A device 110 having a unique identification, such as a device number 114, originates an emergency communication 120, which can be a 911 call. The emergency communication 120 is conveyed to a network, such as packet-switching (PS) core network 140, via an access network 130. In one aspect, network 130, as well as other networks discussed herein, can be wireless or wireline networks, or any combination thereof. As employed herein, device 110 can be embodied in most any user device such as customer premises equipment (e.g., a softphone configured in a tethered computer, a dedicated appliance, such as a set top box, with softphone functionality, a telephone, etc.). The access network 130 is functionally coupled (e.g., communicatively coupled) to the device 110 through a data and signaling pipe 118 and to the PS core network 140 through a data and signaling pipe 134. Each of such data and signaling pipes comprises an upstream link, or uplink (UL), and a downstream link, or downlink (DL). Access network 130, data and signaling pipe 118, data and signaling pipe 134 and PS core network 140 provide device 110 with services such as voice over PS protocol (VoPSP) service, voice-over-internet-protocol (VoIP) service, etc. In an embodiment, the PS core network 140 is an internet protocol multimedia subsystem (IMS) network.

Access network 130 can comprise one or more networks such as wide area networks (WANs), local area networks (LANs), signaling networks (e.g., SS #7), etc.), and so forth. In addition, such networks can operate in accordance with most any communication protocol for wireline communication. In one embodiment, access network 130 is a Hybrid Fiber Coaxial (HFC) cable network that serves as a WAN and provides packet-switched data service (e.g., Internet service). In such embodiment, the access network 130 can be logically split into two functional blocks: a backbone network, which can be a WAN, and a distribution center (e.g., a headend) which can include a termination system, for example, a cable modem termination system (CMTS). The data and signaling pipe 118 can include a last-mile fiber aggregator node, a coaxial tap to the dwelling wherein the device 110 is located, and a cable modem that serves as the network gateway to the dwelling network. The features of fault routing of an emergency communication (e.g., an emergency call) in a PS network described in the subject specification and annexed drawings are not limited to the foregoing embodiment of the access network 130, and can be exploited in substantially any access network that provide packet-switched voice service. In other implementations, access network 130 can be an optical fiber network or a wireless network, or any combinations thereof having appropriate components.

Packet-switching core network 140 includes various network nodes which can be distinguished according to the functionality thereof. As illustrated, the various network nodes can comprise one or more server(s) 144, one or more gateway node(s) 148, and a network repository 152. The one or more server(s) 144 can comprise call management server(s), application server(s), proxy server(s), and the like. While illustrated as a single entity, the network repository 152 can be distributed in order to provide data resiliency and other data management advantages. Functionality and architecture of the one or more server(s) 144, the one or more gateway node(s) 148, and the network repository 152 generally is specific, yet not exclusive, to the embodiment of the PS core network 140. For instance, in an exemplary embodiment in which the PS core network is an IMS network, network repository 152 can be a home subscriber server (HSS); server(s) 144 can comprise application server(s); and specific function control nodes (e.g., Call Session Control Functions (CSCFs), such as serving CSCF (S-CSCF) and interrogating CSCF (I-CSCF)) and proxy servers; and gateway node(s) 148 can comprise a breakout gateway control function (BGCF), a media gateway (MGW) and a signaling gateway (SGW), and media gateway control function (MGCF).

Network nodes, or network elements, in PS core network 140 can be functionally coupled through a bus 156, which enables exchange of information (e.g., data and signaling) among server(s) 144, gateway node(s) 148, and network repository 152. Bus 156 can include a plurality of reference links (Cx, Cr, Dh, Dx, Gm, Ma, Mg, etc.), and related components, and conventional bus architectures such as address buses, system buses, and the like.

Packet-switching core network 140 receives the emergency communication 120 and routes such call to an emergency services network 160, which is functionally coupled to PS core network 140 via a data and signaling pipe 156 comprising an UL and a DL (illustrated in FIG. 1 with arrows in opposing directions). To at least such end, PS core network 140 can exploit a messaging protocol that enables communication among device 110 and at least one network node or other functional element within emergency service network 160. The messaging protocol can include one or more of various session control protocols for packet-switched communication of data, signaling, or both: session initiation protocol (SIP), media gateway control protocol (MGCP), real-time transport protocol (RTP), session description protocol, one or more of the of protocols of the H.323 standard, or the like. In one aspect, the messaging protocol permits PS core network 140 to establish a call session to deliver the emergency communication 120 to a network node associated with an emergency service user-device (e.g., a 911 dispatcher terminal). In another aspect, the messaging protocol permits PS core network 140 to route the emergency communication 120 under an overflow condition that can arise in response to network resources (a gateway node, such as an emergency services gateway (ESGW); a router, such as a selective router (SR); a PSAP trunk; etc.) being unavailable (busy, non-operational, etc.) to emergency service network 160.

Under fault conditions, PS core network 140 can provide emergency service network 160 with information such as (i) administrative data (e.g., an administrative number) for alternative routing of the emergency communication 120, and (ii) the device number 114. As an example, the administrative data (e.g., administrative number) can comprise a 10-digit contingency routing number (CRN) formatted according to NANPA standard, such as a NENA I2 CRN or a NENA I2 alternate emergency access number (AEAN). Availability of device number 114 (dev. num. 114) as a callback number associated with emergency communication 120 is typically not available to an emergency service provider (ESP) in conventional routing schemes under fault conditions.

Figure 2:
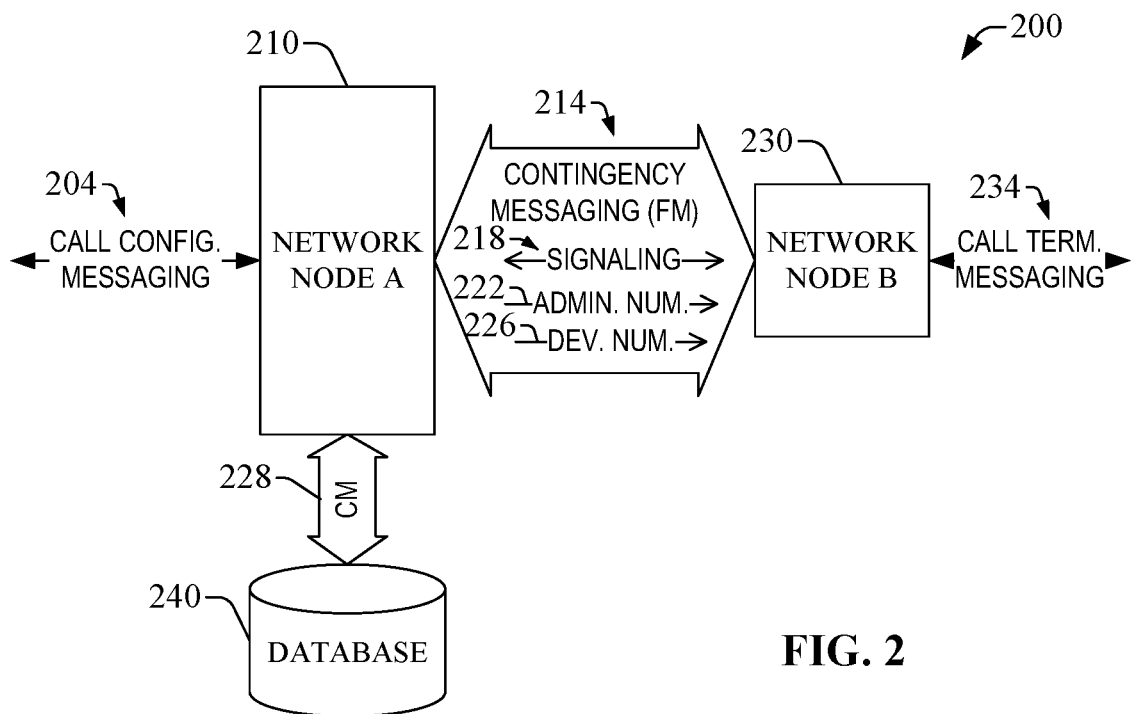
FIGS. 2-3 illustrate exemplary systems for routing of an emergency communication (e.g., an emergency call) of a user in accordance with aspects of the subject disclosure.

FIG. 2 illustrates a block-diagram of an exemplary system 200 that routes an emergency communication (e.g., an emergency call) under fault conditions in accordance with aspects of the subject disclosure. Exemplary system 200 can be part of PS core network 140. Network node A 210 receives at least one message that is part of call configuration (config.) messaging 204, which comprises one or more messages related to establishment of a call session for communication of an emergency communication (e.g., emergency communication 120). The one or more messages can be exchanged among various network nodes (e.g., server(s) 144, gateway node(s) 148, network repository 152, or combinations thereof). In response to receiving the at least one message, network node A 210 exchanges messages (e.g., signaling 218) with network node B 230 to determine availability of such node for routing the emergency communication. In one aspect, availability of network node B 230 can be determined, at least in part, by availability of a network resource (e.g., a gateway node, such as an ESGW; a router, such as a SR; or a PSAP trunk) in an emergency service network (e.g., emergency service network 160) intended to service the emergency communication. If outcome of determination of availability of network node B 230 indicates that such node is unavailable to establish the call session, a fault condition (e.g., overflow condition, failure condition) is detected and, in response, network node A 210 exchanges overflow messaging 228 with a database 240 to access an administrative (admin.) number (num.) 222 that can serve as a circumstantial routing number for the emergency communication related to the call session. It should be appreciated that in certain scenarios and in some embodiments, administrative data other than the administrative number 222 can be accessed. Database 240 can embody a data storage unit (e.g., a computer-readable non-transitory storage medium) of network repository 152. Based on design considerations and affordable complexity, such databases can comprise one or more of DB2®, Microsoft® Access, Microsoft® SQL Server, Oracle®, mySQL, PostgreSQL, or the like.

Network node A 210 receives the administrative number 222 as part of contingency messaging (CM) 228. In one aspect, CM 228 comprises query-response messages wherein a query message is directed to collect the administrative number 222 and a response message related to the query message supplies such number. As described herein, administrative data other than the administrative number 222 can be exploited to accomplished the functionality of the disclosure. As a further response to the fault condition, network node A 210 can update (compose, modify, etc.) a message that is part of contingency messaging 214 to include a device number 226 (which, in certain scenarios, it can be device$^+$ number 114) of user device that originates the emergency communication (emergency communication 120). In certain embodiments, such message also can include the administrative number 222 (e.g., a 10-digit telephone number such as NENA I2 CRN or a 10-digit telephone number such as NENA I2 AEAN). In another aspect, network node A 210 conveys administrative number 222 and device number 226 to network node B 230 in response to the overflow condition.

Network node B 230 receives the administrative number 222 and the device number 226 and delivers one or more messages to complete routing of the emergency communication (e.g., emergency communication 120) to the emergency service network. The one or more messages are part of call termination messaging 234.

Figure 3:
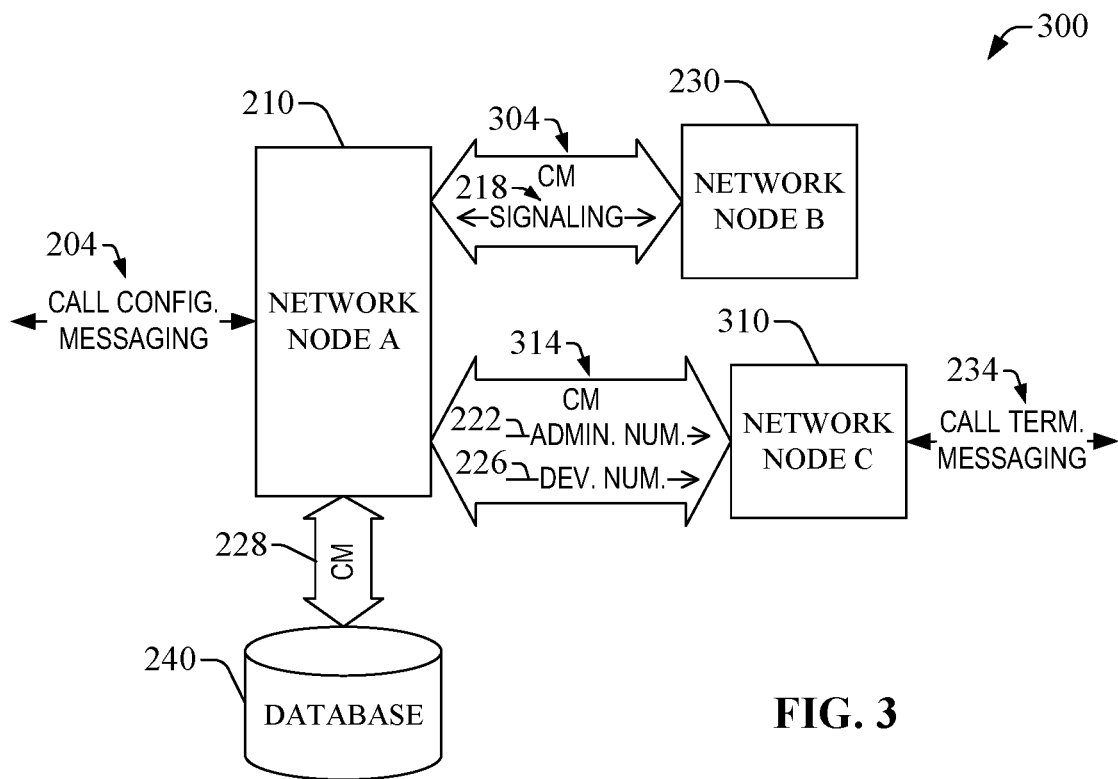

FIG. 3 illustrates a block-diagram of an exemplary system 300 that routes an emergency communication (e.g., an emergency call) under fault conditions in accordance with aspects of the subject disclosure. Exemplary system 300 can be part of PS core network 140. In such system, network node A 210 can exchange contingency messaging 304 with network node B 230. In one aspect, network node A 210 can determine availability of network node B in substantially the same manner as described in connection with exemplary system 200. More specifically, yet not exclusively, network node A 210 can exchange messages (e.g., signaling 218) with network node B and, based on payload data in the messages, establish that network node B 230 is unavailable for establishment of an emergency communication (e.g., emergency communication 120) with an emergency service network (emergency service network 160) intended to service such call. Such unavailability establishes presence of a fault condition and, in response, network node A 210 can access an administrative number 222 from the database 240. In one aspect, as described herein, to access the administrative number 222, network node A 210 can query the database 240 via CM 228. As a further response to the fault condition (e.g., an overflow condition or a failure condition), network node A 210 can update (compose, modify, etc.) a message that is part of CM 314 to include a device number 226 of a user device (e.g., device 110) that originates the emergency communication (e.g., emergency communication 120). In an embodiment, such message also can include the administrative number 222 (e.g., a 10-digit telephone number such as NENA I2 CRN or a 10-digit telephone number such as NENA I2 AEAN).

In response to the fault condition (e.g., overflow condition or a failure condition), network node A 210 can convey administrative number 222 and device number 226 to network node C 310. Network node C 310 receives the administrative number 222 and the device number 226 and delivers one or more messages (e.g., call termination messaging 234) to complete routing of the emergency communication (e.g., emergency communication 120) to the emergency service network (not shown in FIG. 3). In one aspect, network node C 310 is physically distinct from network node A 210 and network node B 230, whereas as described herein, network node B 230 and network node A 210 can be physically the same but functionally different with functional differences dictated by logic (e.g., computer-executable instructions and data) specific to each one of such network nodes.

Figure 4:
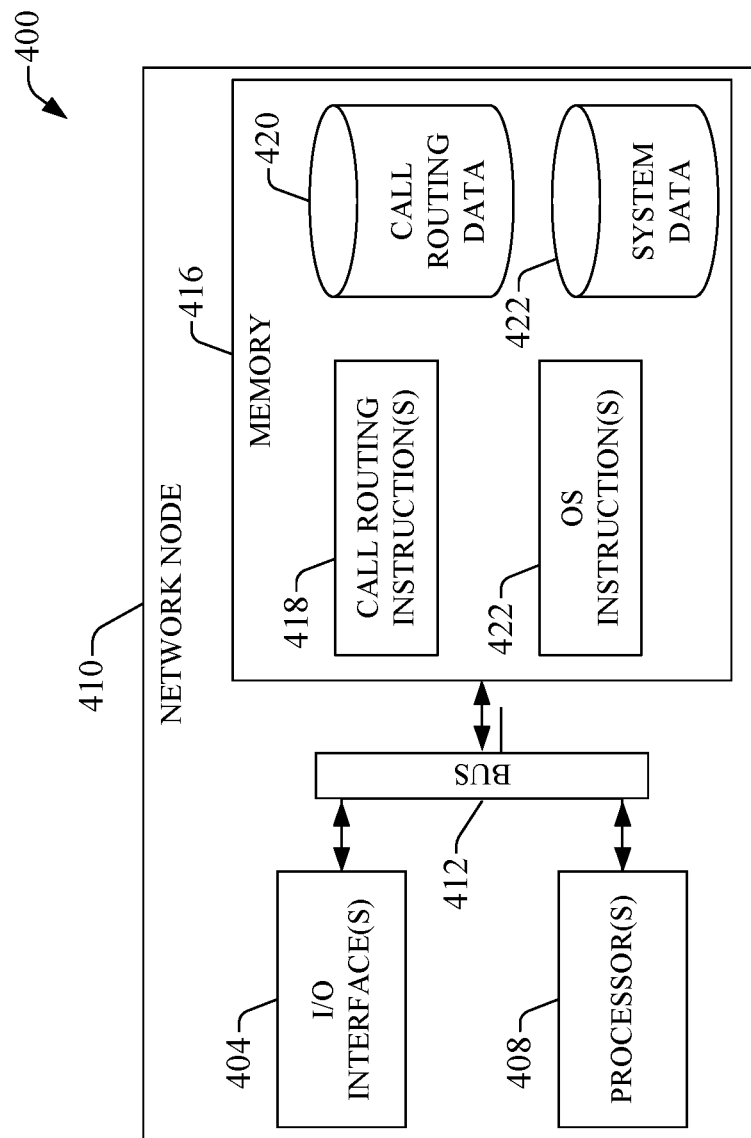
FIG. 4 illustrates an exemplary embodiment of a network node that enables routing of an emergency communication (e.g., an emergency call) in accordance with aspects of the subject disclosure.

FIG. 4 is a block diagram of an exemplary embodiment 400 of a network node 410 that enables routing of an emergency communication (e.g., emergency call) for a user of a PS voice service in accordance with aspects of the subject disclosure. Network node 410 is an apparatus that can embody a network element of PS core network 140. For example, network node 410 can embody a server of server(s) 144, a gateway node of gateway node(s) 148, or a data storage unit of network repository 152). In the illustrated embodiment, network node 410 comprises one or more input/output (I/O) interface(s), one or more processor(s) 408, a memory 416, and a bus 412 that functionally couples various system components including the one or more processor(s) 408 to the memory 416. In the case of multiple processors comprising the group of processors 408, the network node 410 can exploit concurrent computing.

Functionality of network node 410 can be configured by a group of computer-executable instructions (e.g., programming code instructions or programming modules) that can be executed by a processor of the one or more processor(s)

408. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the processor. For example, a first group of computer-executable instructions can configure logic that, in response to execution by the processor, enables the network node 410 to operate as a server (a proxy server, a communication management server, an application server, etc.), a gateway node (a session border controller (SBC), a media gateway control function ((MGCF), etc.), or a data management unit (e.g., an intelligent routing database (IRDB)), which can be part of network repository 152. For another example, another group of computer-executable instructions and data can configure network node 410 to embody one of network node A 210, network node B 230, or network node C 310 and have their respective functionality in accordance with aspects described herein.

Any number of programming code instructions or program modules can be retained in memory 416. Data and computer-accessible instructions, e.g., computer-readable and computer-executable instructions, related to routing of a packet-switched emergency communication under a fault condition can be retained in memory 416. In one aspect, a memory element 420 which is represented as the block call routing data 420, can comprise a variety of data and metadata related to a session control protocol employed for messaging (e.g., exchange of messages) among network node 410 and other network nodes in accordance with aspects of the subject innovation. Data retained in call routing data 420 also can comprise one or more logical addresses (IP addresses, SIP addresses, URI paths, etc.) that can be responsive to specific address-resolution queries received as part of routing an emergency communication in accordance with aspects of the subject disclosure. In another aspect, one or more call routing instruction(s) are retained in memory 416 as a memory element 418 which is represented as the block call routing instruction(s) 418. In the subject specification and annexed drawings, memory elements are illustrated as discrete blocks, however, such memory elements and related computer-executable instructions and data can reside at various times in different storage elements (registers, files, memory addresses, etc.; not shown) in memory 416. In yet another aspect, call routing instruction(s) 418 are stored as an implementation (e.g., a compiled instance) of one or more computer-executable instructions that implement and thus provide at least the functionality of the methods described herein. Call routing instruction(s) 418 also can be transmitted across some form of computer readable media.

Memory 416 can be embodied in a variety of computer-readable media. Exemplary computer-readable media can be any available media that is accessible by a processor in a computing device, such as one of the one or more processor(s) 408 in the network node 410, and comprises, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer or a processor therein or functionally coupled thereto.

In one aspect, memory 416 can comprise computer-readable media in the form of volatile memory, such as random access memory (RAM), or non-volatile memory, such as read only memory (ROM). In one aspect, memory 416 can be partitioned into a system memory (not shown) that can contain data and/or programming modules that enable essential operation and control of network node 410. Such program modules can be implemented (e.g., compiled and stored) in memory element 422, referred to as operating system (OS) instruction(s) 422, whereas such data can be system data that is retained in memory element 424, referred to as system data 424. The OS instruction(s) 422 and system data 422 can be immediately accessible to and/or are presently operated on by at least one processor of the one or more processor(s) 408. Operating system 605 can comprise OSs such as Windows operating system, Unix, Linux, iOS, or substantially any operating system for tethered computing devices. In another aspect, memory 416 can comprise other removable/non-removable, volatile/non-volatile computer non-transitory storage media. By way of example, memory 416 can include a mass storage unit (not shown) which can provide non-volatile storage of computer code, computer readable instructions, data structures, program modules, and other data for the computer 601. As an example, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

In various embodiments of the subject disclosure, the routing processing effected in the disclosed systems and methods can be performed in response to execution of software components (e.g., one or more implementations of call routing instruction(s) 418) by a processor or computing device. In particular, yet not exclusively, to provide specific functionality of network node 410, a processor of the one or more processor(s) 408 in network node 410 can execute at least a portion of call routing instruction(s) 418, consuming call routing data 420 in accordance with aspects of the subject innovation.

First Exemplary Scenario: Network Node 410 Embodies Network Node A.

In one aspect, the computer-executable instructions retained in call routing instruction(s) 418, in memory 416, can configure a processor of the one or more processor(s) 408 to determine unavailability of a first network node (e.g., network node B 230) for an emergency service routing number (ESRN) related to an emergency communication (e.g., emergency communication 120). In another aspect, to determine unavailability of the first network node for the ESRN, the processor can be further configured, by the computer-executable instructions, to deliver a first session initiation message to the second network node, the first session initiation message comprising a first trunk group number associated with a public safety answering point (PSAP), the first trunk group number being related to the ESRN; and receive a second initiation message from the second network node, the second initiation message having a second trunk group number different from the first trunk group number. In one exemplary scenario, the first session initiation message is a session initiation protocol (SIP) INVITE message. In another exemplary scenario, the second session initiation message is a SIP INVITE message. In yet another exemplary scenario, the first session initiation message and the second initiation message are both SIP INVITE messages.

In response to the first network node being unavailable for the ESRN, the processor can be configured, by the computer-executable instructions, to query a database (e.g., database 240) for administrative data (e.g., an administrative number) associated with the ESRN. In addition, as a further response to the first network node being unavailable for the ESRN, the processor is configured, by the computer-executable instructions to update (e.g., create or modify) an identifier (ID) associated with the administrative data (e.g., the administrative number) with data indicative of a user device originating the emergency communication, such as an emergency call, wherein the update yields an updated identifier. In certain scenarios, originating the emergency communication can comprise generating the emergency communication. In other scenarios, originating the emergency communication can comprise transmitting the emergency communication. In yet other scenarios, originating the emergency communication can comprise generating and transmitting the emergency communication. In another aspect, the data can be a 10-digit telephone number (e.g., a 10-digit North American Numbering Plan number).

The processor also is configured, by the computer-executable instructions, to deliver the updated identifier in a session initiation message to a second network node. In one aspect, the processor is further configured, by the computer-executable instructions, to deliver the session initiation message with the administrative number to the second network node, wherein the administrative number is a 10-digit contingency routing number (e.g., NENA I2 CRN or NENA I2 AEAN). In certain routing scenarios, the first network node is the same as the second network node, wherein the first network node is a call management server (CMS). In other routing scenarios, the first network node is a call management server (CMS) and the second network node is a session border controller (SBC). In alternative or additional routing scenarios, the database is an intelligent routing database (IRDB).

Second Exemplary Scenario: Network Node 410 Embodies Network Node B

In one aspect, the computer-executable instructions retained in call routing instruction(s) 418, in memory 416, can configure a processor of the one or more processor(s) 408 to receive a first session initiation message from a first network node (network node A 110), the first session initiation message can comprise a first trunk group number associated with a public safety answering point (PSAP) related to an ESRN intended for routing an emergency communication (e.g., emergency call 120). The computer-executable instructions retained in call routing instruction(s) 418, in memory 416, can configure the processor to route the emergency communication to the ESRN received in the first session initiation message. Accordingly, in one aspect, network node 410 can deliver a session initiation message with the ESRN to an emergency services network node (e.g., an ESGW) in an emergency services network deployed to service the emergency communication. Under a fault condition (e.g., an overflow condition or a failure condition) at the emergency services network, the emergency services network node can deliver an error message (not shown) to network node 410. Accordingly, to contemplate the fault condition, the computer-executable instructions retained in call routing instruction(s) 418, in memory 416, can configure the processor to receive the error message and, in response, supply (e.g., compose and deliver) a second session initiation message to the first network node (network node A 110) in response to receiving the error message. In one aspect, the second session initiation message comprises payload data indicative of a second trunk group number different from the first trunk group number. As described herein, the first session initiation message can be a session initiation protocol (SIP) INVITE message or the second session initiation message is a SIP INVITE message. In addition or in the alternative, the first session initiation message and the second initiation message are both SIP INVITE messages.

By receiving the second session initiation message, the first network node (e.g., network node A 110) can detect the fault condition indirectly, via the foregoing exchange of messages related to routing the emergency communication, rather that receiving the error message from the emergency service network node (e.g., the ESGW).

In general, a processor of the one or more processor(s) 408 refers to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the one or more processor(s) 408 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage or enhance performance of the computing devices that can implement the various aspects of the subject disclosure. In another aspect, the one or more processor(s) 408 can be implemented as a combination of computing processing units.

The one or more input/output (I/O) interface(s) 404 can functionally couple (e.g., communicatively couple) network node 410 to another network node, which can reside within the same network (e.g., PS core network 140) or in an external network (e.g., access network 130). For example, in an embodiment in which the PS core network 140 is an IMS core and network node 410 embodies a MGCF, an I/O interface of the one or more I/O interface(s) 304 can functionally couple the MGCF to a CSCF (e.g., a P-CSCF, an S-CSCF, or an I-CSCF). For another example, in an embodiment in which network node 410 is a gateway node and the access network 130 is the internet, an I/O interface of the one or more I/O interface(s) can functionally couple such gateway node to an internet router in the access network 130.

In addition to enabling network node 410 to be functionally coupled to other network nodes, at least I/O interface of the one or more network interface(s) 404 can functionally couple the network node 410 to a peripheral device, which can be an output device or an input device. Input devices can permit certain service and maintenance (S&M) of network node 410, even though certain S&M can be accomplished remotely through a specific I/O interface (e.g., a network card or adaptor) of the I/O interface(s) 404. Such I/O interface can enable the network node 410 to be functionally coupled to a network operations center (NOC).

In general, output devices can include speakers, a display, a printer, and the like, whereas input devices can include a keyboard or other type of data entry device, such as a microphone, a camera, a pointing device, a joystick, an optical scanner, an radiofrequency identification (RFID) reader, gesture-based input devices such as tactile input devices (e.g., touch screens, or the like), speech recognition devices, natural interfaces, and the like. It should be appreciated that in certain embodiments, design and implementation may result in certain of the foregoing input devices being available or configured for usage in the network node 410. For example, in a scenario in which network node 410 is rack-mountable computer, I/O devices such as a display, a camera, or a printer may not be available.

In certain embodiments, the one or more I/O interface(s) 404 can include at least one port that can permit connection of the network node 410 to peripheral devices, network adaptors such as those present in reference links, and other network nodes. In one aspect, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like.

At least one I/O interface of the one or more I/O interface(s) 404 can enable delivery of output (e.g., output data, output signaling) to another network node (either intra-network node or inter-network node) or a peripheral device. Such output can represent an outcome, or result, of a method or action therein. In one aspect, the output can comprise at least one message related to routing an emergency communication under a fault condition at an emergency services network. In another aspect, such output can be any representation (textual, graphical, aural, etc.) of data or signaling resulting from implementation (e.g., execution) of the methods (or processes) for routing an emergency communication under fault conditions for a user (e.g., a subscriber) of packet-switching voice service. A representation of such data and signaling can be determined, at least in part, by a specific session control protocol employed for implementing routing of the emergency communication.

Bus 412 represents one or more of several types of bus structures, including a memory bus or memory controller, a peripheral bus, an accelerated graphics port, and a processor or local bus using any of a variety of bus architectures. As an example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like.

Figure 10:
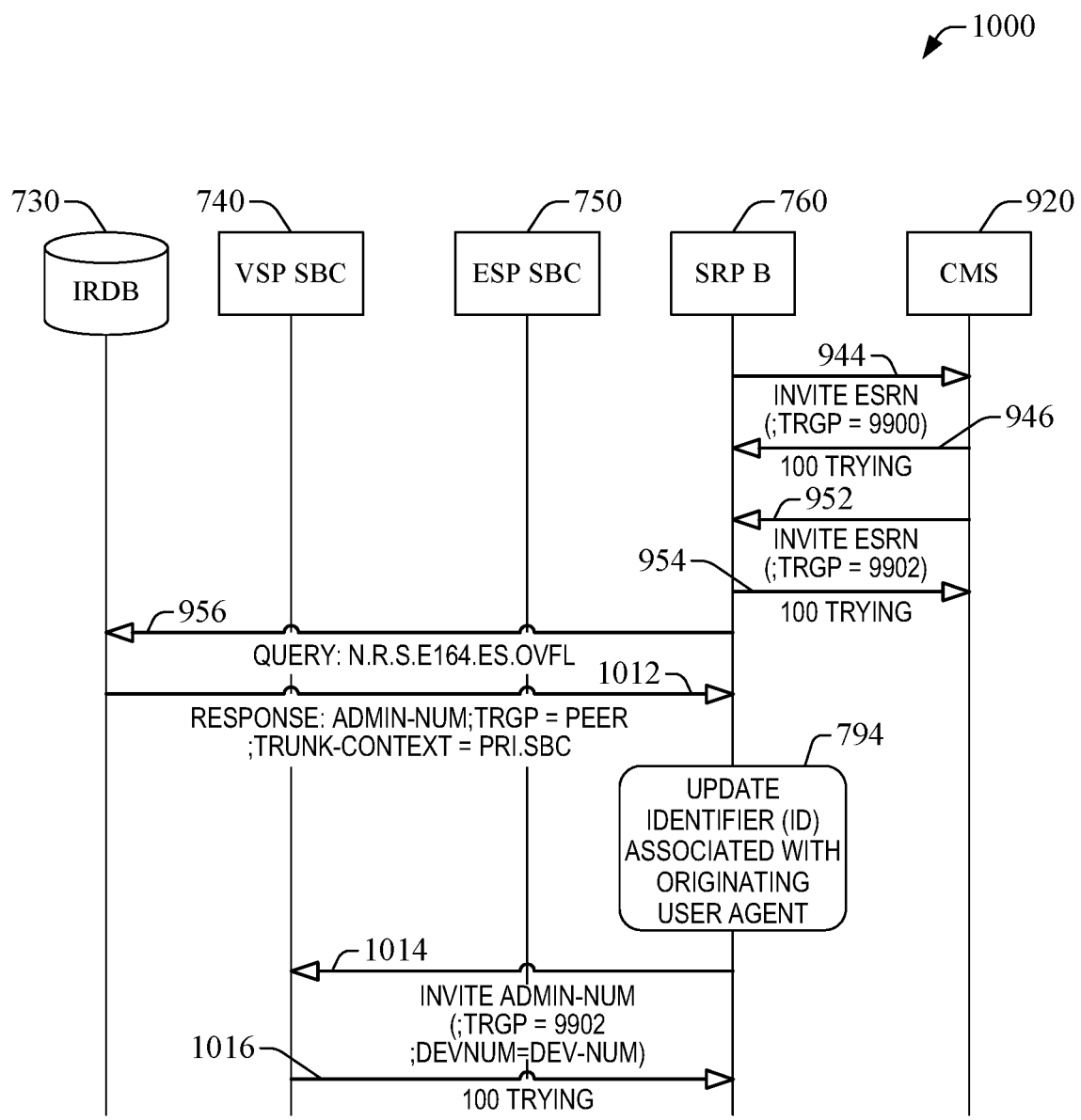
FIG. 10 illustrates an exemplary method for routing an emergency communication (e.g., an emergency call) through an IP multimedia subsystem (IMS) network in another exemplary embodiment according to aspects of the subject disclosure.
Figure 11A:
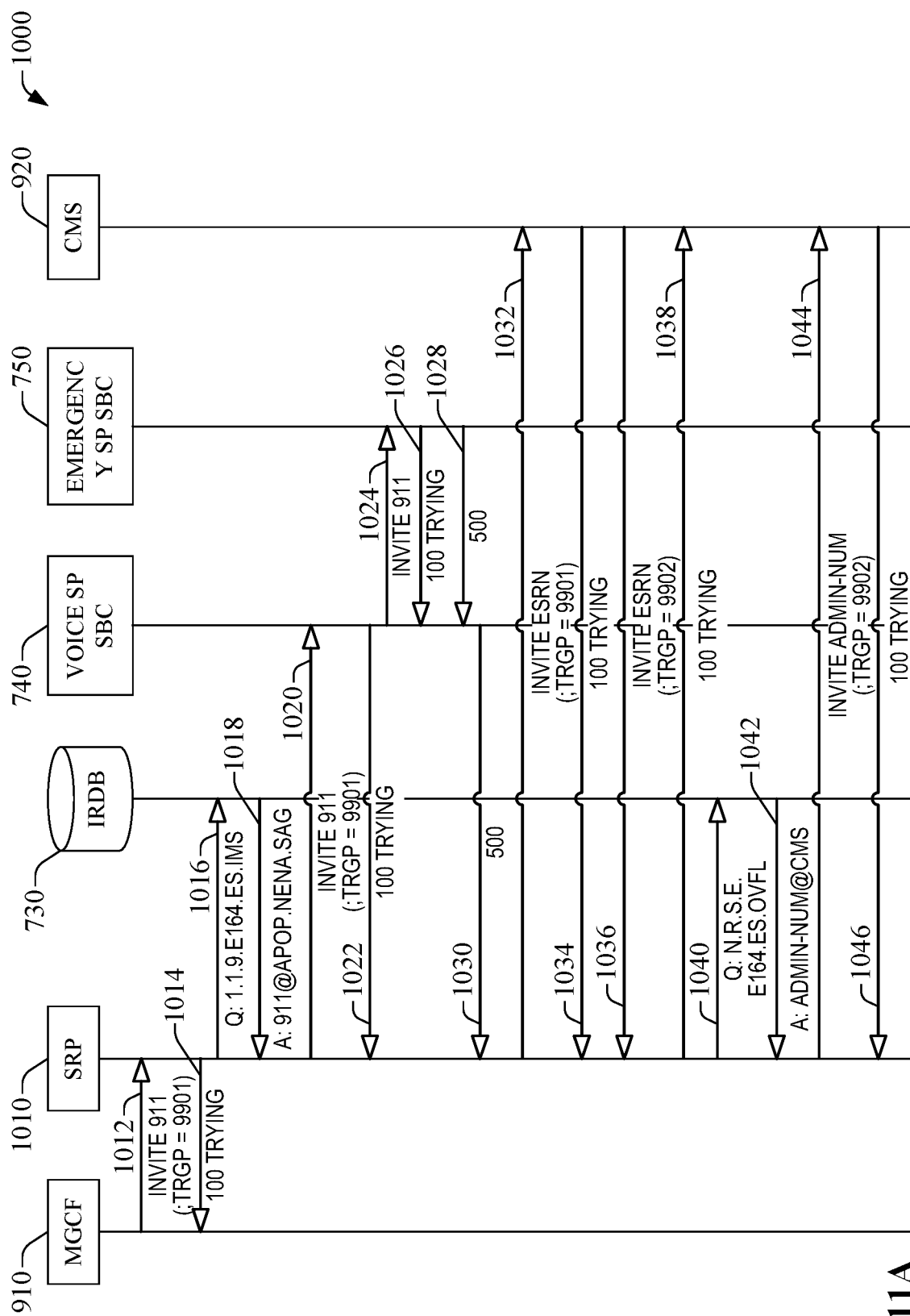
FIGS. 11A-11B illustrate exemplary methods for overflowing an emergency communication (e.g., an emergency call) in the presence of communication error according to aspects of the subject disclosure.
Figure 11B:
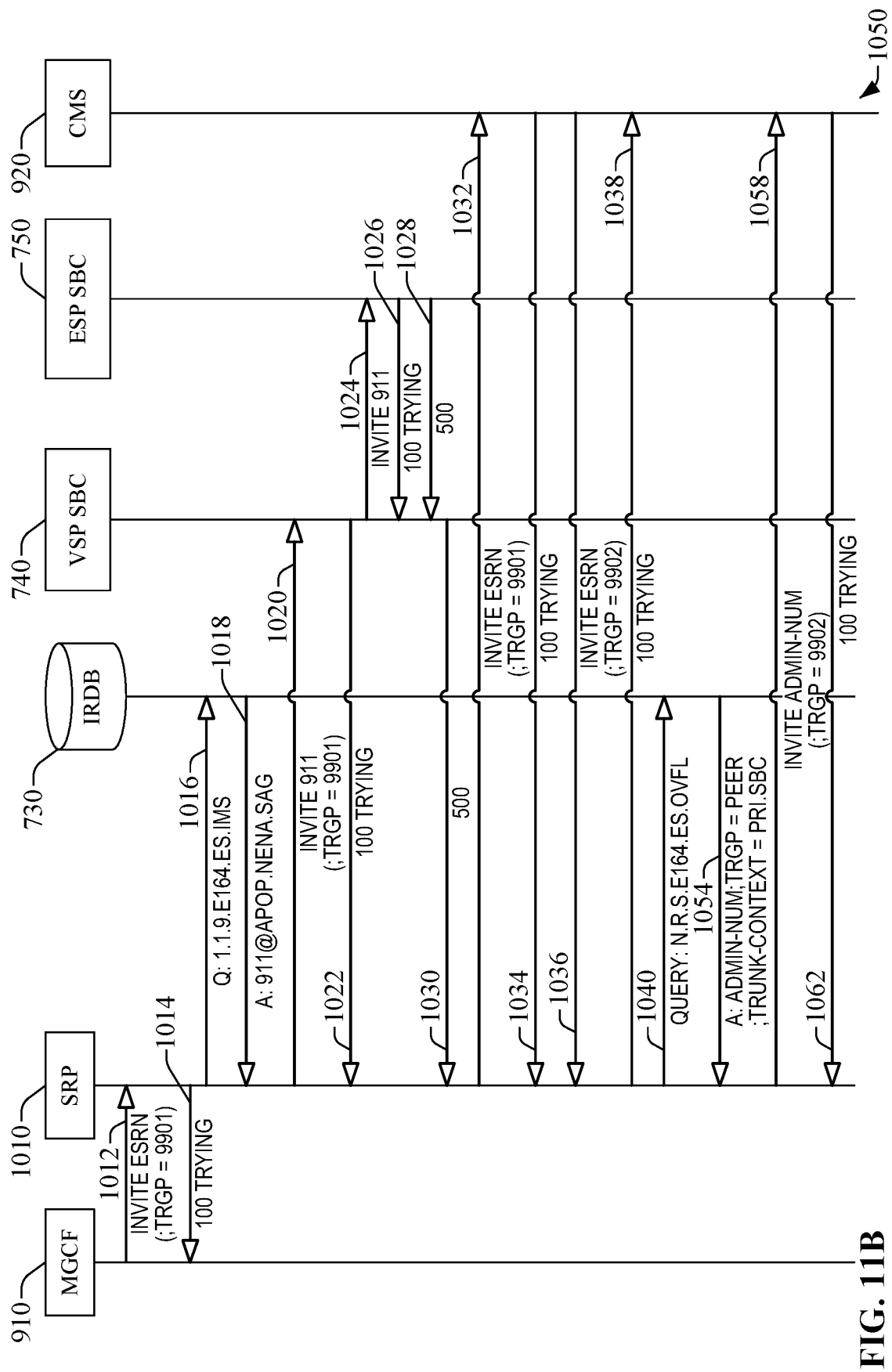
Figure 12:
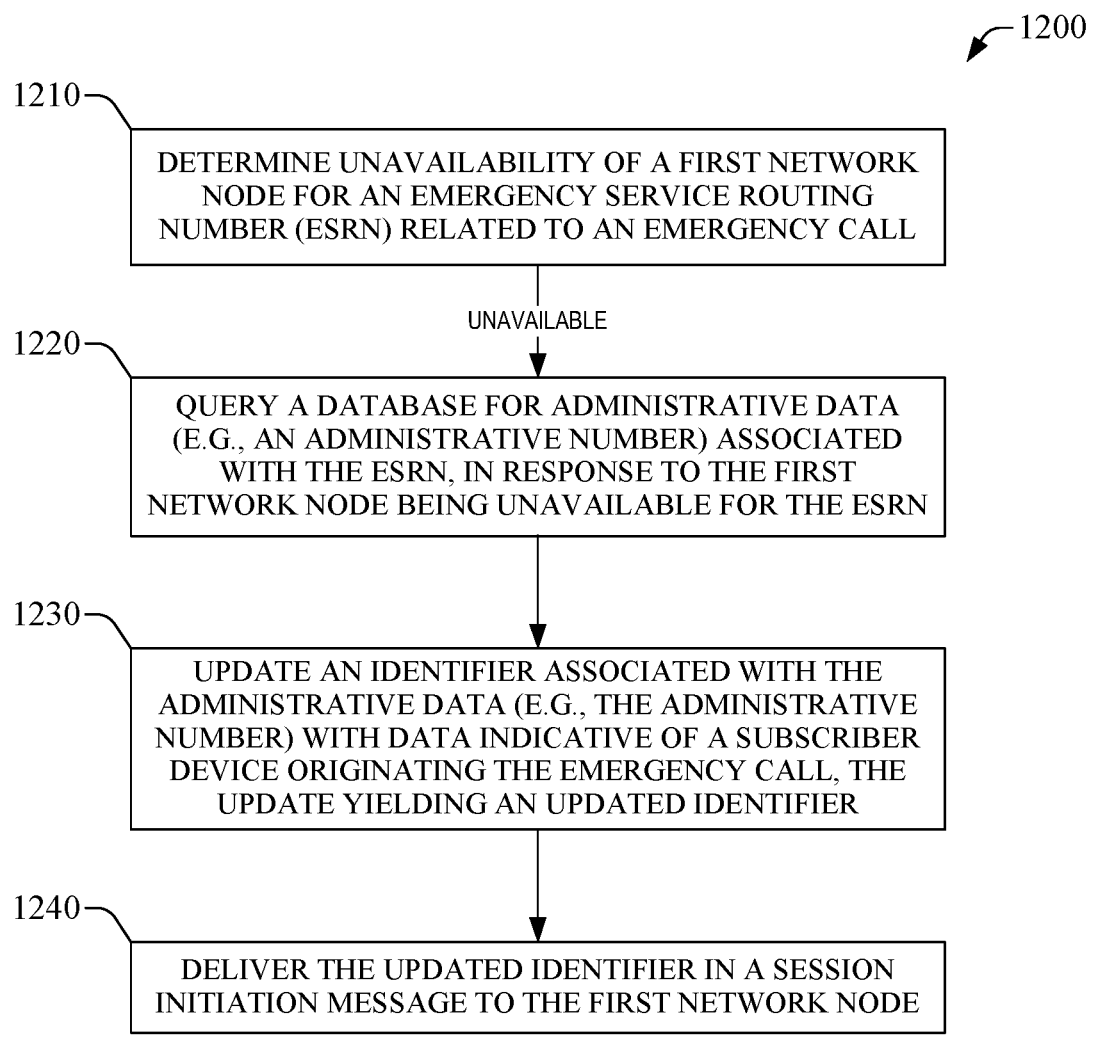
FIGS. 12-13 present flowcharts of exemplary methods for routing an emergency communication (e.g., an emergency call) in accordance with aspects of the subject disclosure.
Figure 13:
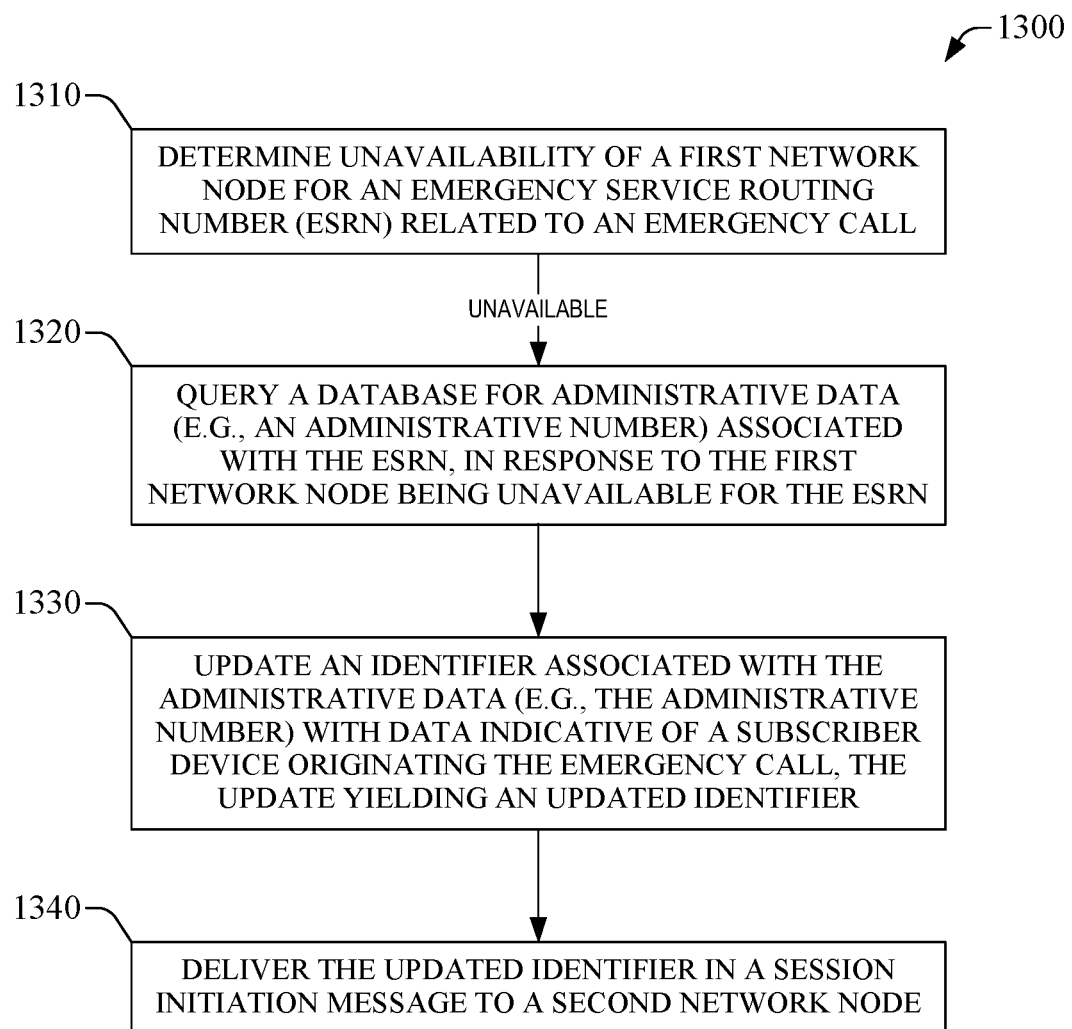

In view of the various aspects of routing of an emergency communication, such as a packet-switched emergency call under fault conditions, such as those described herein, exemplary methods that can be implemented in accordance with the disclosure can be better appreciated with reference to the call flows in FIGS. 5-11B and the flowcharts in FIGS. 12-13. For simplicity of explanation, the exemplary methods disclosed herein are presented and described as a series of actions (also referred to as steps), pictorially represented with a block or as a delivered or received message in a call flow. However, it is to be understood and appreciated that implementation, and related advantages, of such methods is not limited by the order of actions, as some actions may occur in different orders and/or concurrently with other actions from that shown and described herein. For example, the various methods (also referred to as processes) of the subject disclosure can alternatively be represented as a series of interrelated states or events, such as in a state diagram. Moreover, when disparate functional elements (network nodes, units, etc.) implement disparate portions of the methods of the subject disclosure, an interaction diagram or a call flow can represent such methods or processes. Furthermore, not all illustrated actions or messages may be required to implement a method in accordance with the subject disclosure. Further yet, in the illustrated call flows, messages related to routing the emergency communication are represented with an open-head arrow to pictorially indicate that one or more network component(s) in addition to those illustrated as receiving a message can enable delivery and related reception of the message within the call flow.

The methods disclosed throughout the subject specification can be stored on an article of manufacture, or computer-readable storage medium, to facilitate transporting and transferring such methods to computing devices (e.g., desktop computers, mobile computers, mobile telephones, and the like) for execution, and thus implementation, by a processor or for storage in a memory.

Figure 5:
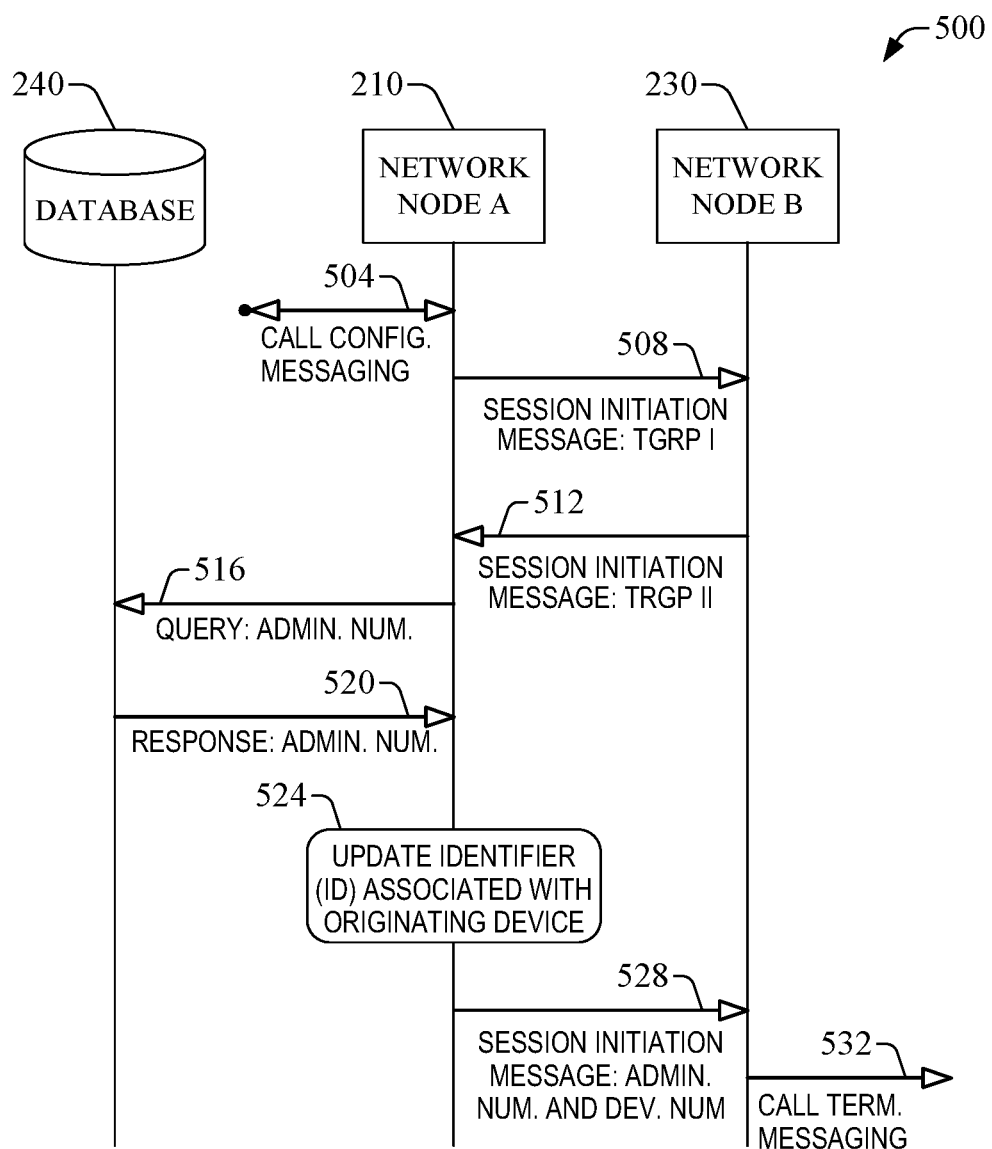
FIGS. 5-6 illustrate exemplary methods for routing an emergency communication (e.g., an emergency call) according to aspects of the subject disclosure.

FIG. 5 is a call flow of an exemplary method 500 for routing an emergency communication such as a packet-switched emergency call under a fault condition according to aspects of the subject disclosure. In the illustrated embodiment, the three functional elements of exemplary system 200 implement, at least in part, the subject exemplary method 500 by exchanging session control messages according to aspects described herein. Network node A 210 receives at least one message in call configuration (config.) messaging 504 that is associated with establishment of an emergency communication (e.g., emergency communication 120). Call configuration messaging 504 can include one or more messages exchanged among various network nodes that are part of the PS core network 130 and emergency network 140.

In response to receiving the at least one message, network node A 210 conveys a session initiation message 508 to network node B 230 comprising payload data representative of a first trunk group number (TRGP I). While not shown, and based on the session control protocol (e.g., SIP, MGCP, RTP, SDP, one or more of the suite of protocols of the H.323 standard, or the like) employed for messaging in exemplary method 500, network node B 230 can respond by delivering a provisional-response message to network node A 210. In one aspect, the session initiation message 508 can be a SIP INVITE message. Yet, the session initiation message 508 can be formatted according to most any session control protocol (e.g., SIP, RTP, SDP, or a protocol of the H.323 standard). As described in connection with exemplary system 200, network node B 230 can determine that a first PSAP trunk group identified by the first trunk group number is unavailable (e.g., busy or non-operational) to establish a call session associated with the emergency communication. Such a determination can result in network node B 230 supplying a session initiation message 512 comprising payload data representative of a second trunk group number (TRGP II).

Unavailability of network node B 230 for establishing the call session associated with the emergency communication (e.g., emergency communication 120) can represent a fault condition (e.g., overflow condition or failure condition) at the emergency services network intended to service the emergency communication. By receiving the session initiation message 512, network node A 210 can detect such fault condition (e.g., overflow condition or failure condition) and, in response, deliver a query message 516 requesting an administrative number (e.g., a 10-digit telephone number such as NENA I2 CRN or a 10-digit telephone number such as NENA I2 AEAN) from database 240. A database manager unit (not shown) that controls data in database 240 can respond to the query message 516 by supplying the administrative number in a response message 520. The format of and payload data in query message 516 and response message 520 are specific to the architecture of the PS network (e.g., PS core network 140) that provides PS voice service.

Network node A 210 receives the response message 520 and, at block 524, updates an identifier (ID) associated with a device (user equipment, customer premises equipment, etc.) that originated the emergency communication. Such device is referred to as the originating device. In one aspect, network node A 210 can update the ID to represent a device number (e.g., a telephone number according to the North American Numbering Plan Administration (NANPA)) of the originating device. Network node A 210 can update the ID in various fashions. For example, network node A 210 can update the identifier with such data by replacing a randomly generated emergency service query key (ESQK) with the telephone number of the user device. For another example, network node A 210 can update the ID by configuring a metadata tag (e.g., ";devnum") to convey the data indicative of the user device originating the emergency communication. The metadata tag can be delivered as part of a session initiation message to a network node that serves as a terminating gateway to the emergency services network configured to service the emergency communication. Such metadata tag is a custom tag that can be incorporated into the session control protocol employed for messaging related to routing of the emergency communication under a fault condition. Incorporation of such metadata tag is seamless to the session control protocol, particularly, yet not exclusively, in text-based protocols such as SIP.

The order in which network node A 210 exchanges query-response messages with database 240 and updates the identifier associated with the originating device can be altered with respect to the order in the embodiment illustrated in FIG. 5. In another embodiment, network node A 210 can implement block 524 prior to exchanging the query message 516 and the response message 520 with database 240. In yet another embodiments, network node A 210 can exchange such messages and implement block 524 nearly concurrently (e.g., through a parallelized implementation).

As a further response to the overflow condition, network node A 210 delivers a session initiation message 528 comprising payload data indicative of the administration number and the device number of the originating device. Network Node B 230 receives the session initiation message 528 and continues to delivers at least one message associated with call termination messaging 532.

Figure 6:
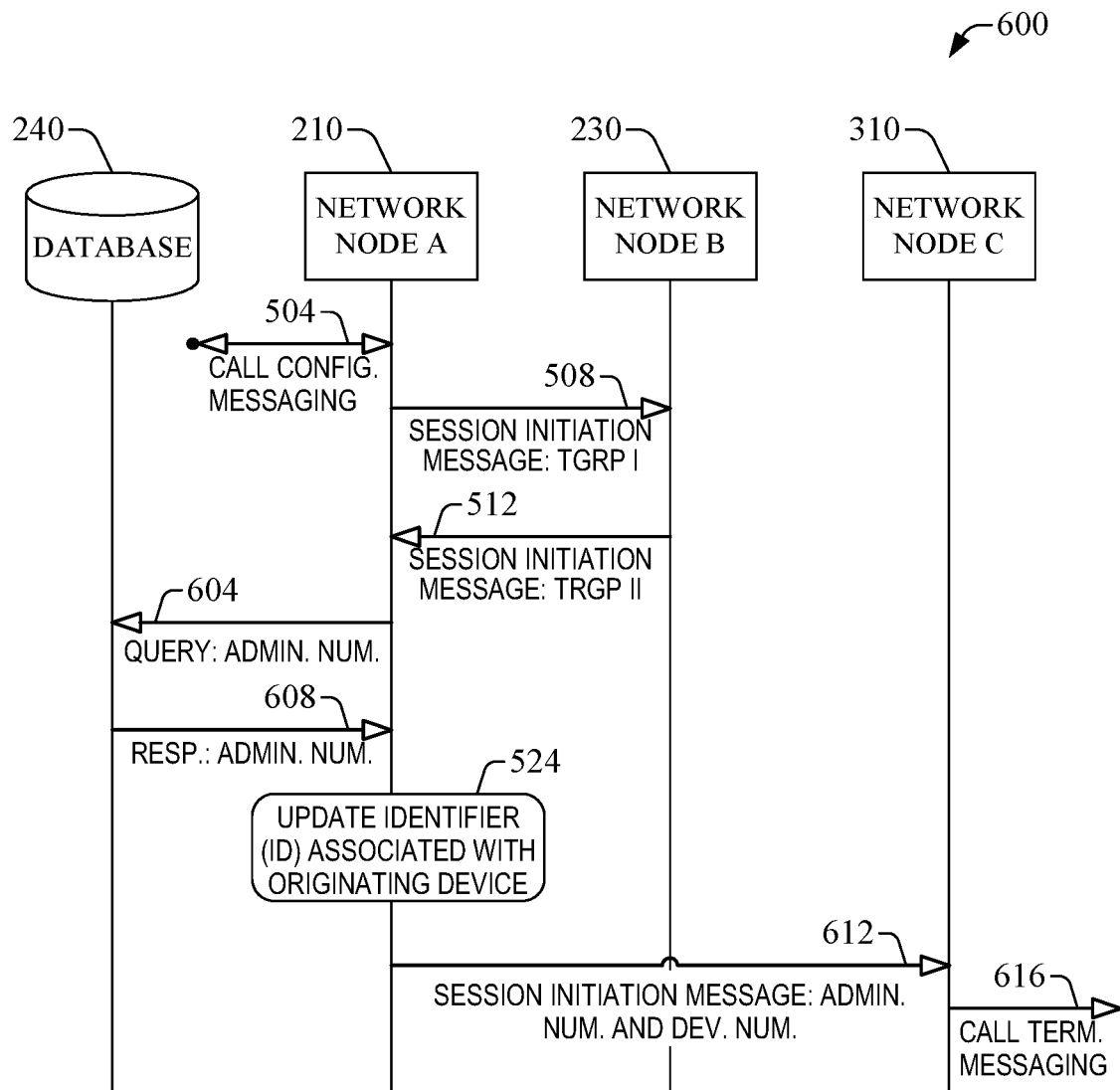

FIG. 6 is a call flow of an exemplary method 600 for routing an emergency communication such as an emergency call in a packet-switching network according to aspects of the subject disclosure. In the illustrated embodiment, the four functional elements of exemplary system 300 implement, at least in part, the subject exemplary method 600 by exchanging session control messages according to aspects described herein. As described in connection with exemplary method 500, network node A 210 receives at least one message that is part of call configuration messaging 504 associated with establishment of an emergency communication (e.g., emergency communication 120). In response to receiving the at least one message, network node A 210 conveys a session initiation message 508 to network node B 230 comprising payload data representative of a first trunk group number (TRGP I). based on the session control protocol (e.g., SIP, MGCP, RTP, SDP, one or more of the suite of protocols of the H.323 standard, etc.) employed for messaging in exemplary system 600, Network node B 230 can respond by delivering a provisional-response message (not shown) to network node A 210. In one aspect, the session initiation message 508 can be a SIP INVITE message. Yet, the session initiation message 508 can be formatted according to most any session control protocol (e.g., SIP, RTP, SDP, or a protocol of the H.323 standard). As described in connection with exemplary system 300, network node B 230 can determine that a first PSAP trunk group identified by the first trunk group number is unavailable (e.g., busy or non-operational) to establish a call session associated with the emergency communication. In certain scenarios, network node B 230 can effect such a determination by receiving an error message from a network node (e.g., ESGW) at the emergency services network 160 intended to service the emergency communication. Such a determination can result in network node B 230 supplying a session initiation message 512 comprising payload data representative of a second trunk group number (TRGP II).

Unavailability of network node B 230 for establishing the call session associated with the emergency communication represents a fault condition (e.g., an overflow condition or a failure condition). By receiving the session initiation message 512, network node A 210 can detect such overflow condition and, in response, deliver a query message 604 requesting an administrative number (e.g., a 10-digit telephone number such as NENA I2 CRN or a 10-digit telephone number such as NENA I2 AEAN) from database 240. A database manager unit (not shown) that controls data in database 240 can respond to the query message 604 by supplying the administrative number in a response (resp.) message 608. The format of query message 604 and response message 608 is specific to the architecture of the PS network (e.g., PS core network 140) that services emergency communications.

Network node A 210 receives the response message 608 and, at block 524, updates an identifier (ID) associated with the originating device (user equipment, customer premises equipment, etc.) of the emergency communication. In one aspect, network node A 210 can update the ID to represent a device number, such as a telephone number according to NANPA, of the originating device. Network node A 210 can update the ID in various fashions as described herein. It should be appreciated that the order in which network node A 210 exchanges query-response messages with database 240 and updates the ID associated with the originating device can be altered with respect to the order in the embodiment illustrated in FIG. 6. In another embodiment, network node A 210 can implement block 524 prior to exchanging the query message 604 and the response message 608 with database 240. In yet another embodiment, network node A 210 can exchange such messages and implement block 524 nearly concurrently (e.g., through parallelized execution).

As a further response to the overflow condition, network node A 210 delivers a session initiation message 612 comprising payload data indicative of the administration number and the device number of the originating device. Network Node B 230 receives the session initiation message 528 and continues to delivers at least one message associated with call termination messaging 616.

As described supra, messaging structure and network elements of a PS network (e.g., PS core network 140) that enable overflow of emergency in accordance with aspects of the subject disclosure are specific, yet not exclusive, to network deployment and functionality features. To illustrate integration of exemplary methods 500 and 600 into exemplary embodiments of PS networks, FIGS. 7A-7B and FIG. 8 illustrate exemplary methods for overflowing an emergency communication (e.g., an emergency call) in illustrative embodiments of a PS core network.

Figure 7A:
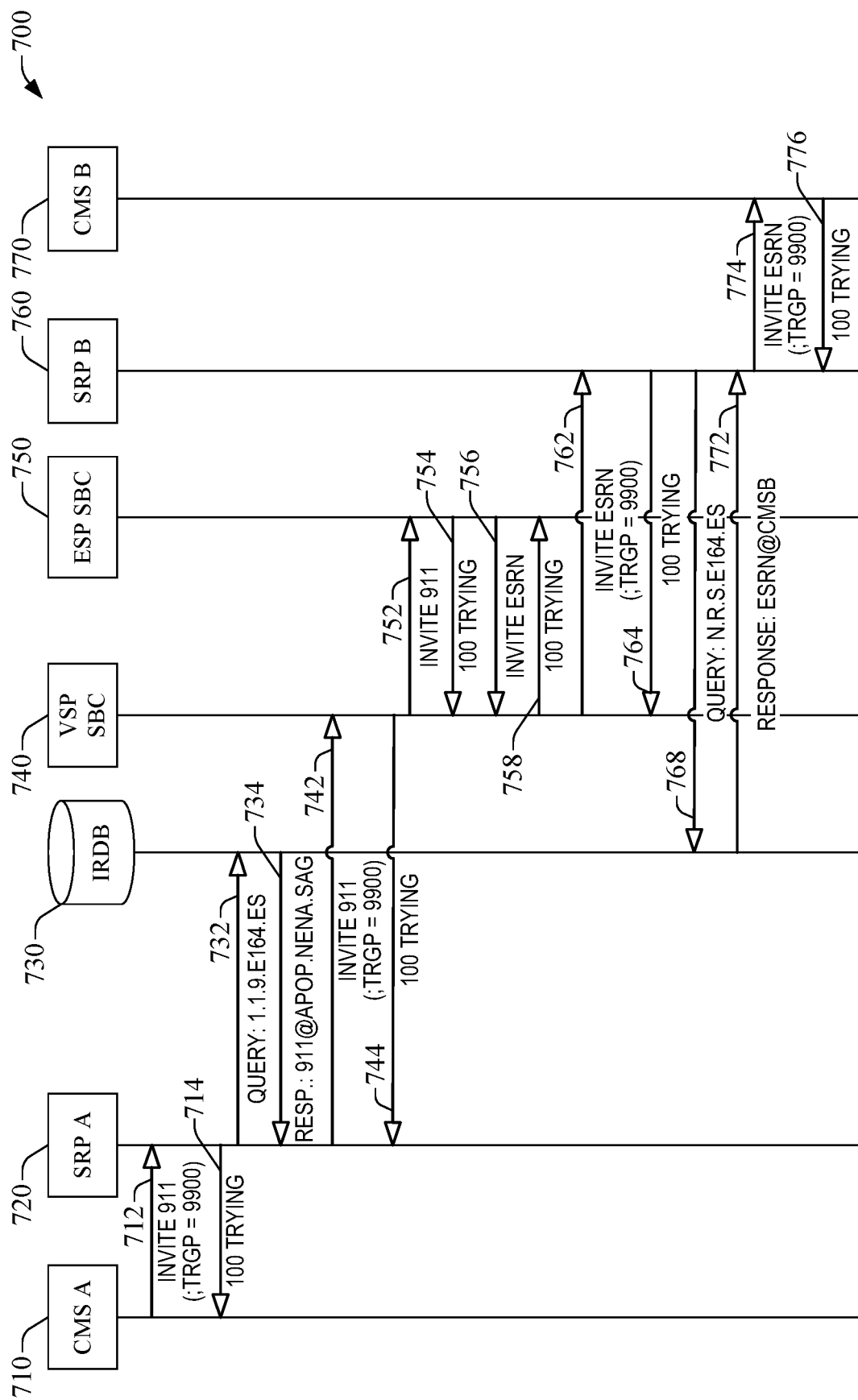
FIGS. 7A-7B illustrate an exemplary method for routing an emergency communication (e.g., an emergency call) through a communication management server (CMS) according to aspects of the subject disclosure.
Figure 7B:
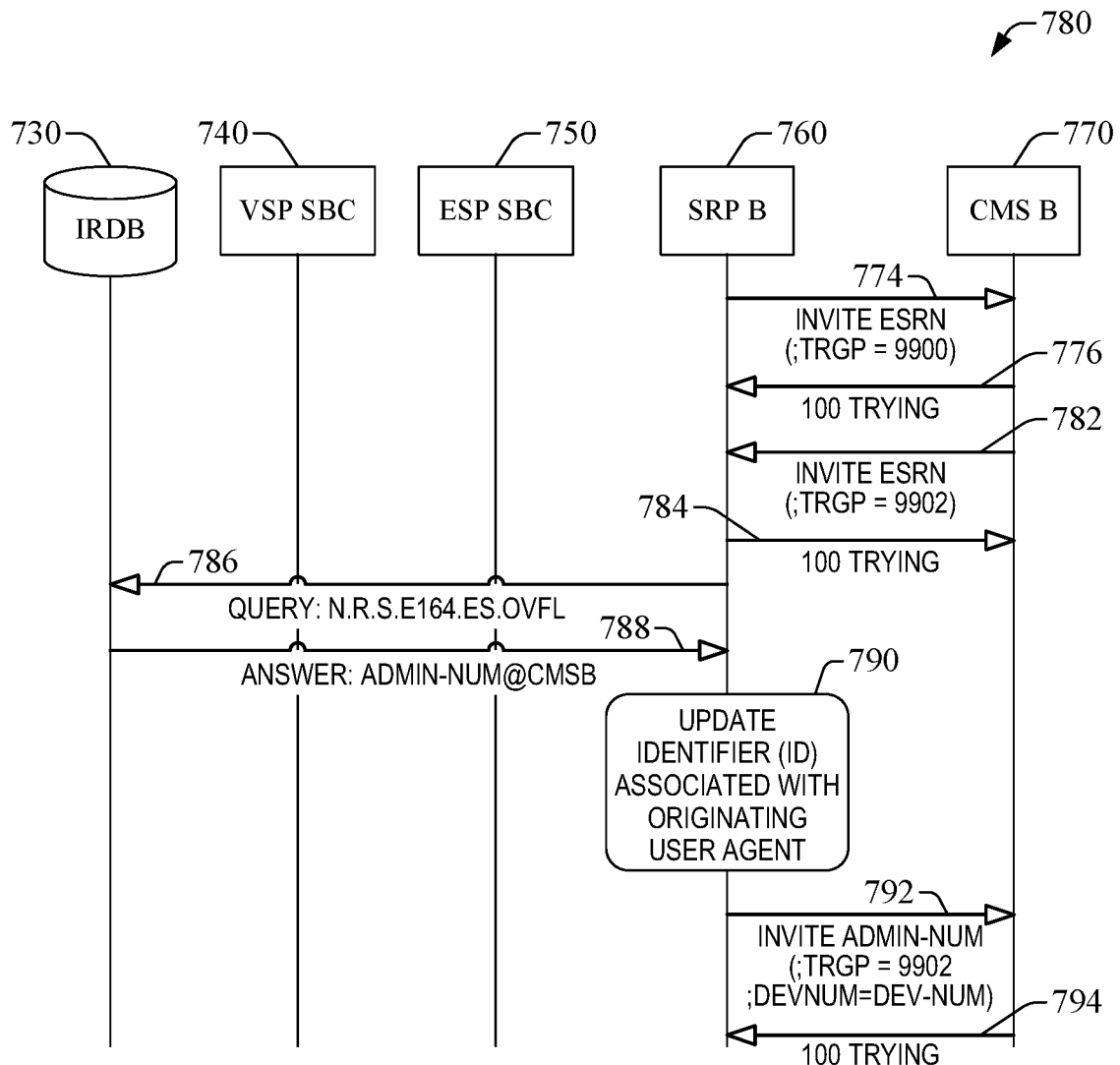
Figure 8:
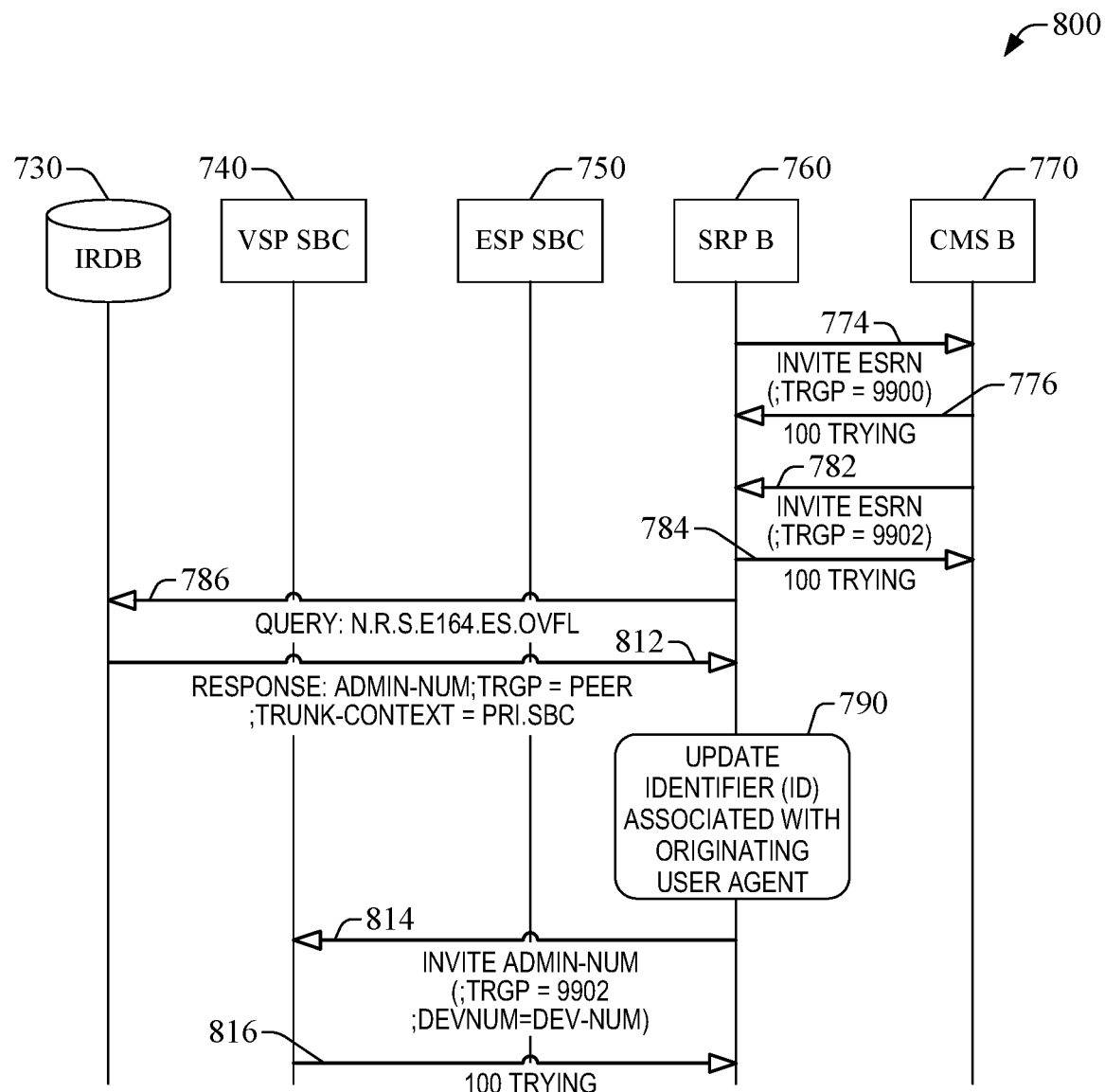
FIG. 8 illustrates an exemplary method for routing an emergency communication (e.g., an emergency call) through a session border controller (SBC) to a session initiation protocol (SIP) peer according to aspects of the subject disclosure.

FIGS. 7A-7B are call flows 700 and 780 of an exemplary method for routing an emergency communication such as emergency call under a fault condition for a user (e.g., a subscriber) of packet-switching voice service (e.g., VoIP). In one exemplary embodiment, the emergency communication is routed through a communication management server according to aspects of the subject disclosure. In such embodiment messaging is effected according to SIP. However, messaging can be implemented according to other session control protocols. Messages 712 through 772 embody at least a portion of call configuration messaging 504.

Communication management server (CMS) A 710 delivers a SIP INVITE 712 to SIP routing proxy A (SRP A) 720. The SIP INVITE 712 is for initiation of a 911 packet-switched call session and comprises a first trunk group number (e.g., ";tgrp=9000"). According to SIP protocol, SRP A 720 responds with a "100 Trying" provisional-response message 714. In addition, SRP A 720 delivers a query message 732 to an intelligent routing database (IRDB) 730. The query message 732 is based on the number "911" and is composed according to E.164 Number Mapping (ENUM) protocol, thus resulting in the following query: "1.1.9.e164.es". The query message 732 is directed to resolving a logical address of a network node (e.g., a server of server(s) 144) in the PS network that provides packet-switched voice service and interfaces with an emergency services network (e.g., emergency services network 160). In one aspect, the logical address is a SIP address or Uniform Resource Identifier (URI) path. In the illustrated embodiment, the network node is a session border controller (SBC), which resides in the PS network (e.g., PS core network 140) of the voice service provider (VSP). In the illustrated embodiment, such network node is represented as VSP SBC 740 and has the following exemplary logical address: "911@apop.nena.sag". In response to receiving the logical address, SRP A 720 conveys a SIP INVITE 911 message 742 to the VSP SBC 740. According to SIP protocol, the VSP SBC 740 replies with a "100 Trying" provisional-response message 744. In addition, VSP SBC 740 relays the SIP INVITE 911 message 742 to a network node of an emergency service provider (ESP) network (e.g., emergency service network 160). In the illustrated embodiment, such network node is a SBC and is represented as ESP SBC 750. Such session initiation message 742 can be relayed as a SIP INVITE 911 message 752. In one aspect, the message 752 is transmitted through an uplink of a data and signaling pipe (e.g., data and signaling pipe 156) that functionally couples the PS network (e.g., PS core network 140) of the VSP with the emergency service network of the ESP.

In addition to responding to VSP SBC 740 with a "100 Trying" provisional-response message 754, ESP SBC 750 conveys a SIP INVITE ESRN message 756 to VSP SBC 740. The emergency service routing number (ESRN) is supplied by the ESP SBC 750, which can be deployed as part of a VPC included in the emergency service network. The ESRN is representative of the logical address of a gateway node (or other network element) in the emergency service network that enables transmission of the emergency communication to an operator device that permits servicing the emergency communication. In one aspect, the gateway node can be an emergency service gateway (ESGW) and the ESRN is can be 10-digit telephone number formatted in accordance with NANPA.

In response to receiving the SIP INVITE ESRN message 756, VSP SBC 740 responds by sending a "100 Trying" provisional-response message 758 to ESP SBC 750, and relaying such session initiation message 756 to SRP B 760 as a SIP INVITE ESRN message 762 comprising the first trunk group number, e.g., "9000" as defined by a protocol tag ";tgrp". SRP B 760 replies by transmitting a "100 Trying" provisional-response message 764 to VSP SBC 740, and conveying a query message 768 to IRDB 730, wherein the query message 768 is directed to resolving a logical address of a network node in the PS network (e.g., PS core network 140) that can route the emergency communication (e.g., the emergency call) related to SIP INVITE 911 message 712. In one aspect, the logical address is a SIP address or Uniform Resource Identifier (URI) path. The query message 768 is based on the ESRN (e.g., a 10-digit North American Numbering Plan number) and is composed according to E.164 Number Mapping (ENUM) protocol, and by appending at least one look-up domain (LD) specific to a server in the group of server(s) 144 that can process ENUM queries (e.g., "es"), thus resulting in the following query: "N.R.S.E.e164.es".

In the illustrated embodiment, emergency communications (e.g., emergency calls) are routed through a CMS. In one aspect, CMS B 770 is configured to route the emergency communication (e.g., emergency call) associated with SIP INVITE 911 message 712. Accordingly, IRDB 730 can deliver a response message 772 comprising payload data indicative of the logical address (e.g., a SIP address) of CMS B 770. Such data can include the following address: "ESRN@cmsb". SRP B 760 receives the response message 772 and, in response to receiving such message, delivers a SIP INVITE ESRN message 774 to CMS B 770, which delivers a "100 Trying" provisional-response message 776.

As illustrated in call flow 780, CMS B 770 receives the SIP INVITE ESRN message 774, which comprises the first trunk group number (e.g., "9900"). In one aspect, CMS B 770 can determine that the first trunk group indicated by the first trunk group number is unavailable for communication (e.g., the first trunk group is busy, non-operational or otherwise unavailable) and, in response, CMS B 770 can select a second trunk group that is available for communication of the emergency communication (e.g., the emergency call) associated with the SIP INVITE ESRN message 774. The second trunk group has a second trunk group number (e.g., "9902" as defined by the value of the protocol tag ";tgrp"). In another aspect, as a further response to the first trunk group being unavailable, CMS B 770 delivers a SIP INVITE ESRN message 782 comprising the second trunk group number.

SRP B 760 receives the SIP INVITE ESRN message 774 and replies by transmitting a "100 Trying" provisional-response message 784 to CMS B 770 and a query message 786 to IRDB 730. In one aspect, SRP B 760 composes the query message 786 based on the ESRN and according to the ENUM protocol, and by appending at least one LD (e.g., "es.ovfl") that reveals presence of a fault condition (overflow condition, failure condition, etc.), thus resulting in the following exemplary query: "N.R.S.E.e164.es.ovfl". Based on the query, IRDB 730 can identify a logical address (e.g., a URI path) for the query conveyed in query message 786, and deliver a response message 788 conveying payload data indicative of the logical address. In view of the LD and its relationship to fault conditions (e.g., overflow conditions), IRDB 730 supplies an address suitable to route the emergency communication in accordance with an administrative number associated with an operational PSAP in the emergency service network. For instance, the logical address can be "admin-num@cmsb".

SRP B 760 can receive the response message 788 and, at block 790, SRP B 760 can update an identifier (ID) associated with a user agent (UA) (user equipment, customer premises equipment, etc.) originating the emergency communication. In one aspect, network node A 210 can update the ID to represent a device number (e.g., a 10-digit telephone number according to NANPA) of the originating UA. SRP B 760 can update the ID in various manners. For example, SRP 760 can update the identifier with such data by replacing a randomly generated emergency service query key (ESQK) with the telephone number of the user device. For another example, SRP B 760 can update the ID by configuring a metadata tag (e.g., ";devnum") to convey the data indicative of the user device originating the emergency communication. The metadata tag can be delivered as part of a session initiation message to a network node that serves as a terminating gateway to the emergency services network configured to service the emergency communication. As described herein, such metadata tag is a custom tag that can be incorporated into the session control protocol employed for messaging related to routing of the emergency communication under a fault condition. Moreover, incorporation of such metadata tag is seamless to the session control protocol, particularly, yet not exclusively, in text-based protocols such as SIP. As described herein, the order in which SRP B 760 exchanges query-response messages with IRD 730 and updates the ID associated with the originating UA can be altered with respect to the order presented in exemplary call flow 780.

To route the emergency communication under the fault condition, SRP B 760 can deliver a SIP INVITE ADMIN-NUM message 792 to CMS B 770. In one embodiment, such message comprising the second trunk group number (e.g., "9902") and the metadata tag ";devnum" set to an exemplary value "DEV-NUM" of the updated identifier. According to SIP, CMS B 770 can respond to message 792 with a "100 Trying" provisional-response message 794.

FIG. 8 is a call flow of an exemplary method 800 for routing an emergency communication (e.g., emergency call) of a user (e.g., subscriber) of PS voice service in an exemplary embodiment. In one embodiment, the emergency communication is routed through a session border controller (SBC) to a session initiation protocol (SIP) peer according to aspects of the subject disclosure.

In exemplary method 800, the messaging among SRP B 760 and CMS B 770 that is associated with determining presence of an overflow condition is substantially the same as that described in connection with call flow 780. In addition, delivery of query message 786 is implemented in substantially the same manner as described in relation to call flow 780. Yet, in the illustrated embodiment, the emergency communication is routed through VSP SBC 740 to a SIP peer. Accordingly, IRDB 730 can supply a response message 812 that is responsive to the query message 790 and different from the response message 788. In one aspect, the response message 812 comprises data representative of an administrative number (e.g., a 10-digit number such as NENA I2 CRN or a 10-digit number such as NENA I2 AEAN) and a trunk group SIP URI. The data representative of the trunk group SIP URI includes the trunk group parameters (1) defined by the protocol tag ";tgrp" and having the exemplary value of "PEER" to indicate the trunk group label, and (2) defined by the protocol tag ";trunk-context" and having the exemplary value of "pri.sbc", which represents a specific peer space. In addition, response message 812 also includes a host name (not shown), which can be generally represented "logical.host". Delivery of such host name as part of the response message 812 can be established by the session control protocol (e.g., SIP, MGCP, RTP, SDP, one or more of the suite of protocols of the H.323 standard, or the like) utilized for session initiation.

SRP B 760 receives the response message 812 and implements block 790 as discussed herein. In another aspect, SRP B 760 delivers a SIP INVITE ADMIN-NUM message 814 to the VSP SBC 740, which is configured to route the emergency communication to the administrative number (e.g., "ADMIN-NUM") identified in the response message 812. In response to such message 814, VSP SBC 740 supplies a "100 Trying" provisional-response message 816. In one aspect, as configured in response message 812, a SIP peer of VSP SBC 740 can be identified by an exemplary host address "sbc.sag" (not shown in FIG. 8), which can be an instance of the general host name "logical.host". The SIP INVITE ADMIN-NUM message 814 also specifies a trunk group number (e.g., "9902" defined by the SIP tag ";tgrp") and a device number (e.g., "DEV-NUM" defined the metadata tag ";devnum") associated with the UA originating the emergency communication and linked to the updated identifier resulting from implementation of block 794.

Figure 9A:
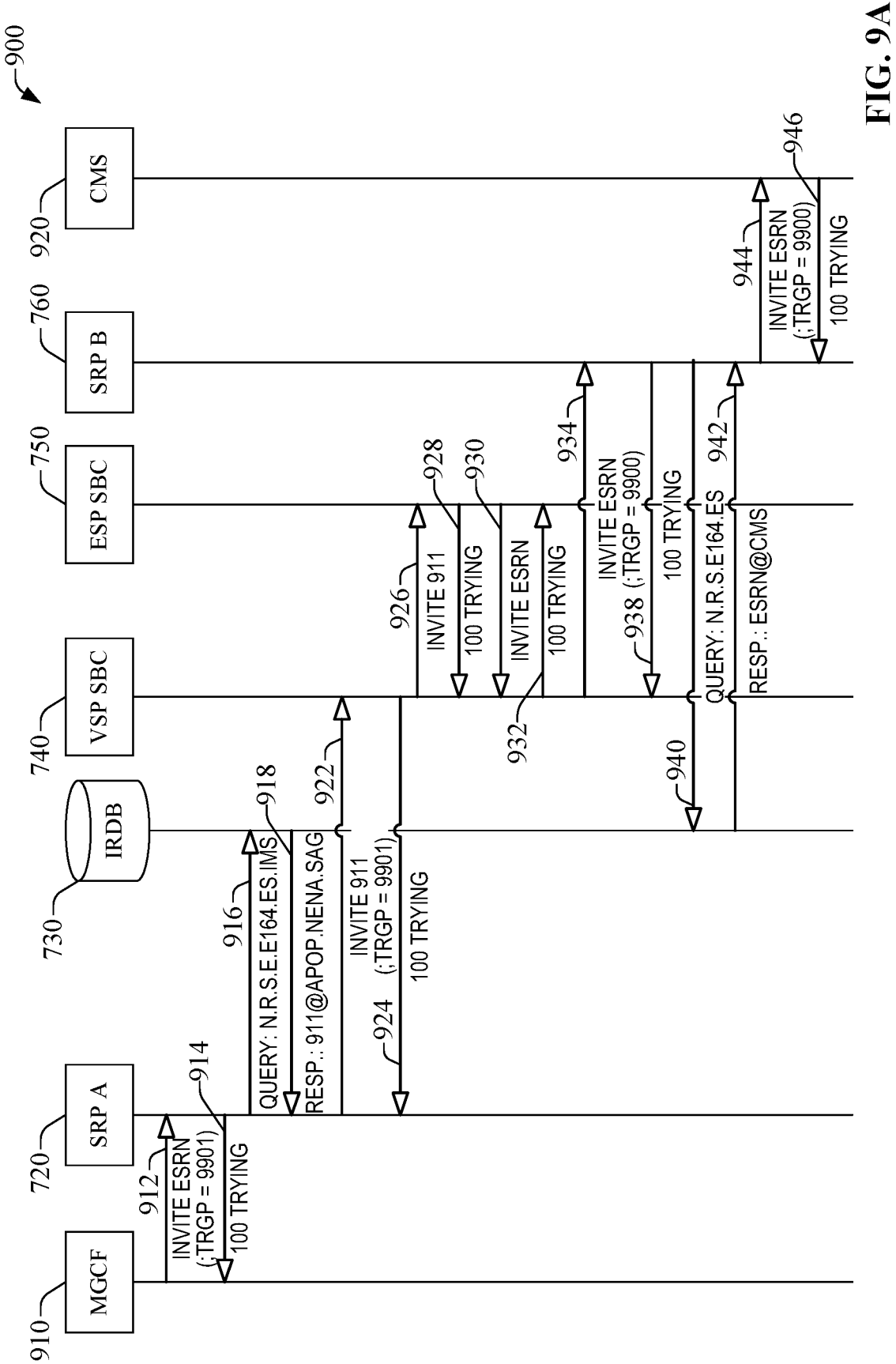
FIGS. 9A-9B illustrate an exemplary method for routing an emergency communication (e.g., an emergency call) through an IP multimedia subsystem (IMS) network in one exemplary embodiment according to aspects of the subject disclosure.
Figure 9B:
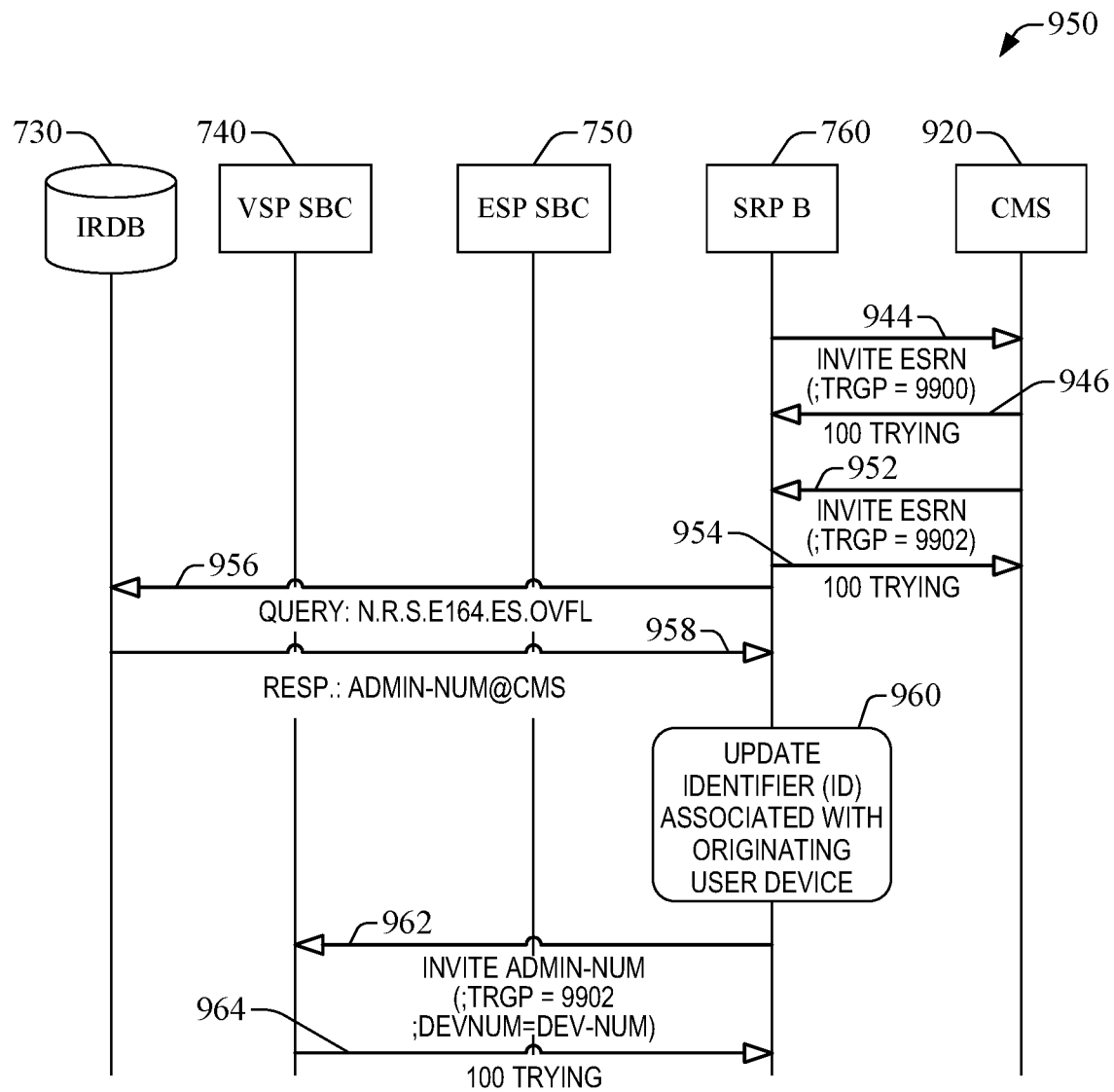

FIGS. 9A-9B are call flows of an exemplary method for routing an emergency communication such as an emergency call for a user of packet-switching voice service (e.g., VoIP). The service can be provided through an IP multimedia subsystem (IMS) network in one exemplary embodiment in which the emergency communication is routed through a CMS according to aspects of the subject disclosure. In such embodiment messaging is effected according to SIP. However, messaging can be implemented according to other session control protocols. Messages 912 through 946 embody at least a portion of call configuration messaging 504.

Media Gateway Controller Function (MGCF) 910 delivers a SIP INVITE ESRN 912 to SRP A 720. The SIP INVITE ESRN 712 comprises a first trunk group number "9901" configured by ";tgrp=9901". SRP A 720 responds with a "100 Trying" provisional-response message 914. In addition, SRP A 720 delivers a query message 732 to IRDB 730 to resolve a logical address of a network node (e.g., a server of server(s) 144) in the PS network that provides packet-switched voice service and interfaces with an emergency service network (e.g., emergency service network 160). The query message 732 is based on the ESRN and is composed according to ENUM protocol, with a look-up domain defined by "es.ims", thus resulting in the following query: "N.R.S.E.e164.es.ims". In one aspect, the logical address is a URI path. In the illustrated embodiment, the network node is a session border controller (SBC), which resides in the PS network (e.g., PS core network 140) of the VSP. In the illustrated embodiment, such network node is represented as VSP SBC 740 and has the following exemplary logical address: "911@apop.nena.sag". It should be appreciated that logical addresses of network nodes described herein can be configured to other values than the exemplary values set forth herein. In response to receiving the logical address, SRP A 720 conveys a SIP INVITE 911 message 922 to the VSP SBC 740. The VSP SBC 740 replies with a "100 Trying" provisional-response message 924. In addition, VSP SBC 740 relays such session initiation message as a SIP INVITE 911 message 926 to ESP SBC 750. As described herein, in one aspect, message 926 can be transmitted through an UL of a data and signaling pipe (e.g., data and signaling pipe 156) that functionally couples the PS network (e.g., PS core network 140) of the VSP with the emergency service network (e.g., emergency service network 160) of the ESP.

In addition to responding to VSP SBC 740 with a "100 Trying" provisional-response message 754, ESP SBC 750 conveys a SIP INVITE ESRN message 930 to VSP SBC 740, wherein the ESRN is the number (e.g., a 10-digit North American Numbering Plan number) employed to resolve the logical address of VSP SBC 740. The ESRN is supplied by the ESP SBC 750, which can be deployed as part of a VPC included in the emergency service network. As described herein, the ESRN is indicative of a gateway node (or other network element) in the emergency service network that enables transmission of the emergency communication to an operator device that permits servicing the emergency communication.

In response to receiving the SIP INVITE ESRN message 930, VSP SBC 740 responds by sending a "100 Trying" provisional-response message 932 to ESP SBC 750, and relaying such session initiation message to SRP B 760 as a SIP INVITE ESRN message 934 comprising a second trunk group number (e.g., "9000" as defined by the protocol tag ";tgrp"). SRP B 760 can reply by transmitting a "100 Trying" provisional-response message 938 to VSP SBC 740, and conveying a query message 940 to IRDB 730, wherein the query message 940 is directed to resolving a logical address of a network node in the PS network (e.g., PS core network 140) that can route the emergency communication related to SIP INVITE ESRN message 934. In one aspect, the logical address is a SIP address or Uniform Resource Identifier (URI) path. The query message 940 is based on the ESRN and is composed according to ENUM protocol, appending an LD specific to a server in the group of server(s) 144 that can process ENUM queries (e.g., "es"), thus resulting in the following query: "N.R.S.E.e164.es".

In the illustrated embodiment, emergency communications are routed through a CMS. In one aspect, CMS 920 is configured to route the emergency communication associated with SIP INVITE 911 message 922. Accordingly, IRDB 730 can deliver a response message 942 comprising payload data indicative of the logical address (e.g., a URI path) of CMS 920. The payload data can include the following address: "ESRN@cmsb". SRP B 760 receives the response message 942 and, in response to receiving such message, delivers a SIP INVITE ESRN message 944 to CMS 920, which delivers a "100 Trying" provisional-response message 946.

As illustrated in call flow 950, CMS 920 receives the SIP INVITE ESRN message 944, which comprises the second trunk group number (e.g., "9900" as defined by the protocol tag ";tgrp"). In one aspect, CMS 920 can determine that the second trunk group indicated by the second trunk group number is unavailable for communication (e.g., the second trunk group is busy or otherwise non-operational) and, in response, select a third trunk group that is available for communication of the emergency communication associated with the SIP INVITE ESRN message 944. The third trunk group has a third trunk group number (e.g., "9902" as defined by the protocol tag ";tgrp"). In another aspect, as a further response to the second trunk group being unavailable, CMS 920 delivers a SIP INVITE ESRN message 952 comprising the third trunk group number.

SRP B 760 receives the SIP INVITE ESRN message 952 and replies by transmitting an information "100 Trying" message 954 to CMS 920 and a query message 958 to IRDB 730. In one aspect, SRP B 760 composes the query message 956 based on the ESRN and according to the ENUM telephony standards, appending a look-up domain (e.g., "es.ovfl") suitable for address resolution in the presence of an overflow condition, thus resulting in the following exemplary query: "N.R.S.E.e164.es.ovfl". Based on the query, IRDB 730 identifies a logical address (e.g., a URI path) for the query conveyed in query message 956 and delivers a response message 958 conveying payload data indicative of the logical address. In view of the LD and its relationship to fault conditions (e.g., overflow conditions), IRDB 730 can supply a logical address (e.g., a URI path) suitable to route the emergency communication in accordance with an administrative number associated with an operational PSAP in the emergency service network. For example, the logical address can be admin-"num@cmsb".

SRP B 760 receives the response message 958 and, at block 960, updates an ID associated with a UA (user equipment, customer premises equipment, etc.) originating the emergency communication. In one aspect, SRP 760 can update the ID to represent a device number (e.g., a 10-digit telephone number according to NANPA) of the originating UA. SRP 760 can update the ID in various manners. For example, SRP 760 can update the identifier with such data by replacing a randomly generated emergency service query key (ESQK) with the telephone number of the user device. For another example, SRP 760 can update the ID by configuring a metadata tag (e.g., ";devnum") to convey the data indicative of the user device originating the emergency communication. The metadata tag can be delivered as part of a session initiation message to a network node that serves as a terminating gateway to the emergency services network configured to service the emergency communication. As described herein, such metadata tag is a custom tag that can be incorporated into the session control protocol employed for messaging related to routing of the emergency communication under a fault condition. As described herein, the order in which SRP B 760 exchanges query-response messages with IRD 730 and updates the ID associated with the originating UA can be altered with respect to the order presented in exemplary call flow 780.

To route the emergency communication under the fault condition, SRP B 760 can deliver a SIP INVITE ADMIN-NUM message 962 to VSP SBC 740. In one embodiment, such message comprises the second trunk group number (e.g., "9902") and the metadata tag ";devnum" set to an exemplary value "DEV-NUM" of the updated identifier. According to SIP, VSP SBC 740 can respond to message 962 with a "100 Trying" provisional-response message 964.

FIG. 10 is a call flow of an exemplary method 1000 for routing an emergency communication such as an emergency call of a user of PS voice service that can, for example, be provided through an IP multimedia subsystem (IMS) network in an exemplary embodiment in which the emergency communication is routed through a session border controller (SBC) to a session initiation protocol (SIP) peer according to aspects of the subject disclosure. In exemplary method 1000, the messaging among SRP B 760 and CMS 920 that is associated with determining presence of an overflow condition is substantially the same as that described in connection with call flow 950. In addition, delivery of query message 956 is implemented in substantially the same manner as described in relation to call flow 950. Yet, in the illustrated embodiment, the emergency communication is routed through VSP SBC 740 to a SIP peer. Accordingly, IRDB 730 supplies a response message 1012 responsive to the query message 956 that is different from the response message 958. In one aspect, the response message 1012 comprises data representative of an administrative number (e.g., a 10-digit CRN) and a trunk group SIP URI. As described herein, the data representative of the trunk group SIP URI includes the trunk group exemplary parameters (1) "PEER" to indicate the trunk group label through the protocol tag ";tgrp", and (2) "pri.sbc" representing a trunk context (or the peer space) as defined by the protocol tag ";trunk-context". In addition, as described herein, response message 1012 also includes a host name (not shown), which can be generally represented "logical.host". Delivery of such host name as part of the response message 1012 can be established by the session control protocol (e.g., SIP, MGCP, RTP, SDP, one or more of the suite of protocols of the H.323 standard, or the like) utilized for session initiation.

In one aspect, SRP B 760 receives the response message 1012 and implements block 794 as discussed herein. In another aspect, SRP B 760 delivers a SIP INVITE ADMIN-NUM message 1014 to the VSP SBC 740, which is configured to route the emergency communication to the administrative number identified in the response message 1012. In response to such message 1014, VSP SBC 740 supplies a "100 Trying" provisional-response message 1016. As configured in response message 1012, a SIP peer of VSP SBC 740 is identified by the exemplary host address "sbc.sag" (not shown in FIG. 8), which can be an instance of the general host name "logical.host". The SIP INVITE ADMIN-NUM message 1014 also specifies a trunk group number (e.g., "9902" defined by ";tgrp") and a device number (e.g., a telephone number according to NANPA format) associated with the UA originating the emergency communication (e.g., the emergency call) and linked to the updated identifier resulting from implementation of block 794.

FIGS. 11A-11B illustrate exemplary methods for routing an emergency communication, such as an emergency call for a user (e.g., a subscriber) of packet-switched voice service. Such methods can be implemented in a PS network in the presence of communication error according to aspects of the subject disclosure. In the illustrated embodiments, messaging can be effected according to SIP, for example. Messaging also can be implemented according to other session control protocols (e.g., H.225 protocol of the H.323 suite of protocols). Regarding exemplary method 1000, MGCF 910 delivers a SIP INVITE ESRN 1012 to SRP 1010. The SIP INVITE ESRN 1012 comprises a first trunk group number (e.g., "9001" defined by the protocol tag ";tgrp"). SRP 1010 can respond with a "100 Trying" provisional-response message 1014. In addition, SRP 1010 can deliver a query message 1016 to IRDB 730 to resolve a logical address of a network node (e.g., a server of server(s) 144) in the PS network that provides packet-switched voice service, and interfaces with an emergency service network (e.g., emergency service network 160). The query message 1016 is based on the ESRN and is composed according to ENUM protocol, with a look-up domain suitable for resolving a logical address of an IP multimedia subsystem (IMS) node, e.g., the LD is "es.ims". The resulting query is "N.R.S.E.e164.es.ims". In one aspect, the logical address is a URI path of the network node, which can be a session border controller (SBC) that is part of the PS network (e.g., PS core network 140) of the VSP. In the illustrated embodiment, such network node is represented as VSP SBC 740 and has the following logical address: "911@apop.nena.sag". In response to receiving the logical address, SRP 1010 conveys a SIP INVITE 911 message 1020 to the VSP SBC 740. The VSP SBC 740 can reply with a "100 Trying" provisional-response message 924, and relays such session initiation message as a SIP INVITE 911 message 1024 to ESP SBC 750, which replies with a "100 Trying" provisional-response message 1026. As described herein, in one aspect, message 1024 can be transmitted through an UL of a data and signaling pipe (e.g., data and signaling pipe 156) that functionally couples the PS network (e.g., PS core network 140) of the VSP with the emergency service network (e.g., emergency service network 160) of the ESP.

In one aspect, ESP SBC 750 delivers an error message 1028, which is illustrated as a "500" SIP message. The error message 1028 can arise from various sources, such as failure to locate a suitable routing number for the UA originating the emergency communication. VSP SBC 740 receives the error message 1028 and relays it to SRP 1010 as an error message 1030 (e.g., "500" SIP message). Delivery of message 1030 represents overflow of the emergency communication according to pre-contemporaneous protocol (e.g., pre-NENA I2 standard) for handling emergency communications.

As illustrated, SRP 1010 delivers a SIP INVITE ESRN message 1032, which comprises the first trunk group number (e.g., ";tgrp=9901"). In response, CMS 920 delivers a "100 Trying" provisional-response message 1034. CMS 920 also transmits a SIP INVITE ESRN message 1036, which comprises a second trunk group number (e.g., ";tgrp=9902") different from the first trunk group number. In one aspect, SRP 1010 responds with a "100 Trying" provisional-response message 1038. In another aspect, SRP 1010 delivers a query message 1040 to IRDB 730. As described herein, SRP 1010 composes the query message 1040 based on the ESRN and according to the ENUM telephony standards, appending at least on look-up domain (e.g., "es.ovfl") suitable for address resolution in the presence of a fault condition. The resulting query can be "N.R.S.E.e164.es.ovfl". Based on the query, IRDB 730 identifies a logical address (e.g., a URI path) for the query conveyed in query message 956 and delivers a response message 1042, which conveys payload data indicative of the logical address. In view of the LD and its relationship to fault conditions, IRDB 730 can supply an address to route the emergency communication in accordance with an administrative number associated with an operational PSAP in the emergency service network. For instance, the logical address can be "admin-num@cms".

In response to receiving the response message 1042, SRP 1010 can deliver a SIP INVITE ADMIN-NUM message 1044 to CMS 920. In one aspect, the SIP INVITE ADMIN-NUM message 1044 comprises payload data indicative of a second trunk group number (e.g., "9902" configured by ";tgrp"). In another aspect, the SIP INVITE ADMIN-NUM also includes a device number of the UA originating the emergency communication. CMS 920 can respond with a "100 Trying" provisional-response message 1046.

Messaging structure of exemplary method 1050 has a substantial overlap with messaging structure of exemplary method 1000. Messages 1012 through 1042 are common to both exemplary methods. Yet, in the illustrated embodiment, response message 1054, which is responsive to the query message 1042, comprises data representative of an administrative number (e.g., a 10-digit telephone number such as NENA I2 CRN or a 10-digit telephone number such as NENA I2 AEAN) and a trunk group SIP URI. As described herein, the data representative of the trunk group SIP URI includes the exemplary trunk group parameters (1) "PEER" to indicate the trunk group label through the protocol tag ";tgrp", and (2) "pri.sbc" representing a specific exemplary trunk context (or peer space) as configured by the protocol tag ";trunk-context". In addition, response message 1054 also includes a host name (not shown), which can be generally represented "logical.host". Delivery of such host name as part of the response message 1054 can be established by the session control protocol (e.g., SIP, MGCP, RTP, SDP, one or more of the suite of protocols of the H.323 standard, or the like) utilized for session initiation. SRP 1010 delivers a SIP INVITE ADMIN-NUM message 1058 comprising payload data indicative of the second trunk group number (e.g., "9902" defined by the protocol tag ";tgrp"). In response to receiving such message 1058, CMS 920 delivers a "100 Trying" provisional-response message 1062, and transmits at least one message (not shown) related to call termination messaging 234.

FIGS. 12-13 are flowcharts of exemplary methods for routing an emergency call or other emergency communications in accordance with aspects of the subject disclosure. In certain embodiments, exemplary method 1200 can be implemented (e.g., performed or executed) by a network node (e.g., SRP B 760) of a packet-switching core network (e.g., PS core network 140) or a processor therein or functionally couple thereto. At block 1210, unavailability of a first network node (e.g., CMS B 770) for an emergency service routing number (ESRN) related to an emergency communication (e.g., a 911 call) is determined. In one aspect, determining such unavailability comprises delivering, by the first network node, a first session initiation message to the second network node, the first session initiation message comprising the ESRN and a first trunk group number associated with a PSAP, the first trunk group number being related to the ESRN; and receiving a second initiation message from the first network node, the second initiation message having a second trunk group number different from the first trunk number. As described herein, the first session initiation message and the second session initiation message can be delivered according to various session control protocols (SIP, MGCP, RTP, SDP, one or more of the suite of protocols of the H.323 standard, etc.). In one embodiment, the first session initiation message is a SIP INVITE message. In another embodiment, the second session initiation message is a SIP INVITE message. In yet another embodiment, the first session initiation message and the second initiation message are both SIP INVITE messages.

At block 1220, in response to the first network node being unavailable for the ESRN, a database is queried for administrative data (e.g., an administrative number) associated with the ESRN. In certain embodiments, the database can be an intelligent routing database (e.g., IRDB 730). At block 1230, an identifier (ID) associated with the administrative data (e.g., the administrative number) is updated (composed, modified, etc.) with data indicative of a user device (e.g., device 110) originating the emergency communication (e.g., the 911 call). In certain scenarios, originating the emergency communication can comprise generating the emergency communication. In other scenarios, originating the emergency communication can comprise transmitting the emergency communication. In yet other scenarios, originating the emergency call can comprise generating and transmitting the emergency communication. Updating the identifier yields an updated identifier. In one embodiment, the data is a telephone number associated to the user device or an electronic serial number (ESN) thereof. In one aspect, updating the ID comprises configuring a metadata tag (e.g., ";devnum") to convey the data indicative of the user device originating the emergency communication. The metadata tag is a custom tag that can be incorporated into the session control protocol employed for messaging related to routing of the emergency communication under a fault condition. In another aspect, updating the identifier with such data comprises replacing a randomly generated emergency service query key (ESQK) with the telephone number or the ESN. At block 1240, the updated identifier is delivered in a session initiation message to the first network node (e.g., CMS B 770).

In certain embodiments, exemplary method 1200 also can comprise returning an error message to a caller switch node associated with the user device, wherein a second network node, such as SRP A 720, can deliver the error message.

Exemplary method 1300 can be implemented by the network node that implements (e.g., performs, execute) exemplary method 1200. At block 1310, unavailability of a first network node (e.g., CMS B 770) for an ESRN (e.g., a 10-digit telephone number according to the NANPA format) related to an emergency communication (e.g., a 911 call) is determined. In one aspect, determining such unavailability comprises delivering a first session initiation message to the first network node, the first session initiation message comprising the ESRN and a first trunk group number associated with a public safety answering point (PSAP), the first trunk group number being related to the ESRN; and receiving a second initiation message from the second network node, the second initiation message having a second trunk group number different from the first trunk number. As described herein, the first session initiation message and the second session initiation message can be delivered according to various session control protocols (SIP, MGCP, RTP, SDP, a protocol of the H.323 standard, etc.). In one embodiment, the first session initiation message is a session initiation protocol (SIP) INVITE message. In another embodiment, the second session initiation message is a SIP INVITE message. In yet another embodiment, the first session initiation message and the second initiation message are both SIP INVITE messages.

At block 1320, in response to the first network node being unavailable for the ESRN, a database is queried for administrative data (e.g., an administrative number) associated with the ESRN. In certain embodiments, the database can be an intelligent routing database (e.g., IRDB 730). At block 1330, an identifier associated with the administrative data (e.g., the administrative number) is updated (composed, modified, etc.) with data indicative of a user device (e.g., device 110) originating the emergency communication (e.g., the 911 call). Updating the identifier yields an updated identifier. In one embodiment, the data is a telephone number associated to the user device or an electronic serial number (ESN) thereof. In one aspect, updating such identifier comprises configuring a metadata tag (e.g., ";devnum") to convey the data indicative of the user device originating the emergency communication. The metadata tag is a custom tag that can be incorporated into the session control protocol employed for messaging related to routing of the emergency communication under a fault condition. In another aspect, updating the identifier with such data comprises replacing a randomly generated emergency service query key (ESQK) with the telephone number. At block 1340, the updated identifier is delivered in a session initiation message to a second network node (e.g., VSP SBC 740).

Similarly, yet not identically, to exemplary method 1100, in certain embodiments exemplary method 1300 also can comprise returning an error message to a caller switch node associated with the user device, wherein a second network node, such as SRP A 720, delivers the error message.

Various advantages related to routing an emergency communication, such as a packet-switched emergency call, emerge from the foregoing description. As an example, overflow routing of an emergency communication according to aspects described herein is resilient to errors in information related to a calling number of a user device originating the emergency communication. In NENA I2 standard, such errors can arise in the course of configuring an ESQK associated with the emergency communication. In particular, yet not exclusively, in a scenario in which the emergency communication fails, by providing an identifier indicative of the calling party information, the overflow routing set forth in the subject disclosure remains immune to the random replacement of the calling number of the user device with the ESQK. As another example, the routing described herein provides reliability features based on a failover solution that can seamlessly be integrated into conventional routing without the complexity (e.g., added call session legs and length) present in typical solutions. For instance, incorporation of the identifier indicative of the calling party information can be accomplished through suitable metadata added into session control messaging. As yet another example, overflow routing that comprises the identifier described herein enables an operator in an emergency services network to initiate a downstream call session to the user device.

One or more embodiments of the subject disclosure can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the systems, apparatuses, and methods have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where a description of a protocol, procedure, process, or method does not actually recite an order to be followed by its acts or steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments will be apparent from consideration of the specification and practice disclosed herein. It is intended that the specification and examples be considered as non-limiting illustrations only, with a true scope and spirit of the subject disclosure being indicated by the following claims.

What is claimed is:

1. A method, comprising:
   receiving, by a routing device, a first message, wherein the first message is received in response to an emergency communication from a user device;
   sending, to a routing database, a second message to facilitate communication with a network node that interfaces with an emergency services network;
   sending, based on a response to the second message that indicates an error, a third message to a communication computing device;
   receiving, from the communication computing device, data that indicates a logical address;
   sending, to the routing database, a fourth message comprising the data that indicates the logical address;
   receiving an identifier associated with the user device; and
   sending, to the communication computing device, the identifier associated with the user device to facilitate the emergency communication from the user device.

2. The method of claim 1, wherein the second message indicates a query to determine an identifier associated with the network node, and wherein the second message is based on an E.164 Number Mapping (ENUM) Protocol.

3. The method of claim 1, wherein the logical address comprises at least one of: an IP address, a Session Initiation Protocol (SIP) address, or a Uniform Resource Identifier (URI) path.

4. The method of claim 1, wherein the first message comprises a Session Initiation Protocol (SIP) message comprising a trunk group number, and wherein the SIP message is a SIP INVITE message for initiating the emergency communication.

5. The method of claim 1, wherein the routing device comprises a Session Initiation Protocol (SIP) routing proxy, and wherein the communication computing device comprises a communication management server.

6. The method of claim 1, wherein the data that indicates the logical address comprises a trunk group number, and wherein the third message is based on an Emergency Service Routing Number (ESRN).

7. The method of claim 1, further comprising:
   sending, to the network node based on the response to the second message, a fifth message, wherein the error indicates an error associated with the fifth message.

8. A method, comprising:
   receiving, by a routing device, a first message, wherein the first message is received in response to an emergency communication from a user device;
   sending, to a routing database, a second message that facilitates a determination of a network node that interfaces with an emergency services network;
   sending, to the network node based on a response to the second message, a third message;
   receiving, from the network node, an indication of an error associated with the third message;
   sending, based on the indication of the error, a fourth message to a communication computing device;
   receiving, from the communication computing device, data that indicates a logical address;
   sending, to the routing database, a fifth message comprising the data that indicates the logical address;
   receiving an identifier associated with the user device; and sending, to the communication computing device, the identifier associated with the user device to facilitate the emergency communication from the user device.

9. The method of claim 8, wherein the second message indicates a query to determine an identifier associated with the network node, and wherein the second message is based on an E.164 Number Mapping (ENUM) Protocol.

10. The method of claim 8, wherein the logical address comprises at least one of: an IP address, a Session Initiation Protocol (SIP) address, or a Uniform Resource Identifier (URI) path.

11. The method of claim 8, wherein the first message comprises a Session Initiation Protocol (SIP) message comprising a trunk group number, and wherein the SIP message is a SIP INVITE message for initiating the emergency communication.

12. The method of claim 8, wherein the routing device comprises a Session Initiation Protocol (SIP) routing proxy, and wherein the communication computing device comprises a communication management server.

13. The method of claim 8, wherein the data that indicates the logical address comprises a trunk group number, and wherein the fourth message is based on an Emergency Service Routing Number (ESRN).

14. An apparatus, comprising:
one or more processors; and
a memory storing processor executable instructions that, when executed by the one or more processors, cause the apparatus to:
receive a first message, wherein the first message is received in response to an emergency communication from a user device;
send, to a routing database, a second message to facilitate communication with a network node that interfaces with an emergency services network;
send, based on a response to the second message that indicates an error, a third message to a communication computing device;
receive, from the communication computing device, data that indicates a logical address;
send, to the routing database, a fourth message comprising the data that indicates the logical address;
receive an identifier associated with the user device; and
send, to the communication computing device, the identifier associated with the user device to facilitate the emergency communication from the user device.

15. The apparatus of claim 14, wherein the second message indicates a query to determine an identifier associated with the network node, and wherein the second message is based on an E.164 Number Mapping (ENUM) Protocol.

16. The apparatus of claim 14, wherein the logical address comprises at least one of: an IP address, a Session Initiation Protocol (SIP) address, or a Uniform Resource Identifier (URI) path.

17. The apparatus of claim 14, wherein the first message comprises a Session Initiation Protocol (SIP) message comprising a trunk group number, and wherein the SIP message is a SIP INVITE message for initiating the emergency communication.

18. The apparatus of claim 14, wherein the apparatus comprises a Session Initiation Protocol (SIP) routing proxy, and wherein the communication computing device comprises a communication management server.

19. The apparatus of claim 14, wherein the data that indicates the logical address comprises a trunk group number, and wherein the third message is based on an Emergency Service Routing Number (ESRN).

20. The apparatus of claim 14, wherein the processor executable instructions, when executed by the one or more processors, further cause the apparatus to:
send, to the network node based on the response to the second message, a fifth message, wherein the error indicates an error associated with the fifth message.

\* \* \* \* \*